(12) United States Patent
Singh et al.

(10) Patent No.: US 12,598,642 B2
(45) Date of Patent: Apr. 7, 2026

(54) REFERENCE RESOURCE FOR DOWNLINK PREEMPTION IN NR-U

(71) Applicant: Telefonaktiebolaget LM Ericsson (publ), Stockholm (SE)

(72) Inventors: Bikramjit Singh, Raasepori (FI); Alexey Shapin, Luleå (SE); Ali Behravan, Stockholm (SE); Mai-Anh Phan, Herzogenrath (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 699 days.

(21) Appl. No.: 17/914,536

(22) PCT Filed: Mar. 26, 2021

(86) PCT No.: PCT/SE2021/050274
§ 371 (c)(1),
(2) Date: Sep. 26, 2022

(87) PCT Pub. No.: WO2021/201754
PCT Pub. Date: Oct. 7, 2021

(65) Prior Publication Data
US 2023/0141148 A1 May 11, 2023

Related U.S. Application Data

(60) Provisional application No. 63/004,015, filed on Apr. 2, 2020.

(51) Int. Cl.
*H04W 74/0816* (2024.01)
*H04W 74/00* (2009.01)
*H04W 74/08* (2024.01)

(52) U.S. Cl.
CPC ..... *H04W 74/0816* (2013.01); *H04W 74/006* (2013.01); *H04W 74/0866* (2013.01)

(58) Field of Classification Search
CPC ........... H04W 74/0816; H04W 74/006; H04W 74/0866; H04W 72/00; H04W 72/232;
(Continued)

(56) References Cited

U.S. PATENT DOCUMENTS

| | | | |
|---|---|---|---|
| 2016/0212625 A1* | 7/2016 | Damnjanovic | ... H04W 74/0875 |
| 2019/0222284 A1 | 7/2019 | Huang | |

(Continued)

FOREIGN PATENT DOCUMENTS

| | | |
|---|---|---|
| EP | 3248434 A1 | 11/2017 |
| WO | 2016112131 | 7/2016 |
| WO | 2018064128 A1 | 4/2018 |

OTHER PUBLICATIONS

International Search Report and Written Opinion of the International Searching Authority, PCT/SE2021/050274/, mailed Jul. 1, 2021, 15 pages.

(Continued)

*Primary Examiner* — Gary Mui
*Assistant Examiner* — Yewon Kim
(74) *Attorney, Agent, or Firm* — Sage Patent Group

(57) ABSTRACT

A method by a network node in a wireless communication network includes buffering first data for downlink transmission to a first wireless device, and preemptively transmitting the first data on a channel that is subject to clear channel assessment procedures. The first data is transmitted in a reference downlink resource (RDR) domain in the channel in which second data for a second wireless device was previously scheduled for transmission by the network node. The method further includes transmitting a preemption indicator to the second wireless device, the preemption indicator identifying the RDR domain. Related network nodes, methods of operating a wireless device, and wireless devices are also disclosed.

27 Claims, 13 Drawing Sheets

(58) Field of Classification Search
CPC ........... H04W 72/569; H04W 72/0446; H04W
74/0808; H04B 7/0413
See application file for complete search history.

(56) References Cited

U.S. PATENT DOCUMENTS

| | | | |
|---|---|---|---|
| 2019/0254081 A1 | 8/2019 | Li et al. | |
| 2020/0008216 A1* | 1/2020 | Iyer ....................... | H04W 72/23 |
| 2020/0100226 A1* | 3/2020 | Hosseini ............... | H04W 72/23 |
| 2020/0236709 A1* | 7/2020 | Park .................. | H04W 74/0816 |
| 2020/0367278 A1* | 11/2020 | Hosseini ............... | H04W 76/27 |
| 2021/0051706 A1* | 2/2021 | Yang .................... | H04W 76/10 |

OTHER PUBLICATIONS

"3rd Generation Partnership Project; Technical Specification Group Radio Access Network; Physical layer procedures for shared spectrum channel access (Release 15)", 3rd Generation Partnership Project (3GPP), 3GPP TS 37.213 V15.2.0, Mar. 2019, 20 pages.
3rd Generation Partnership Project; Technical Specification Group Radio Access Network; NR; Physical layer procedures for control (Release 15), 3rd Generation Partnership Project (3GPP), 3GPP TS 38.213 V15.8.0, Dec. 2019, 109 pages.
"5 GHz RLAN; Harmonised Standard covering the essential requirements of article 3.2 of Directive 2014/53/EU", Harmonised European Standard, ETSI EN 301 893 V2.1.1, May 2017, 122 pages.
"NR-Based Access to Unlicensed Spectrum", Qualcomm Inc., RP-190706, 3GPP TSG RAN Meeting #83, Shenzhen, China, Mar. 18-21, 2019, 8 pages.

* cited by examiner

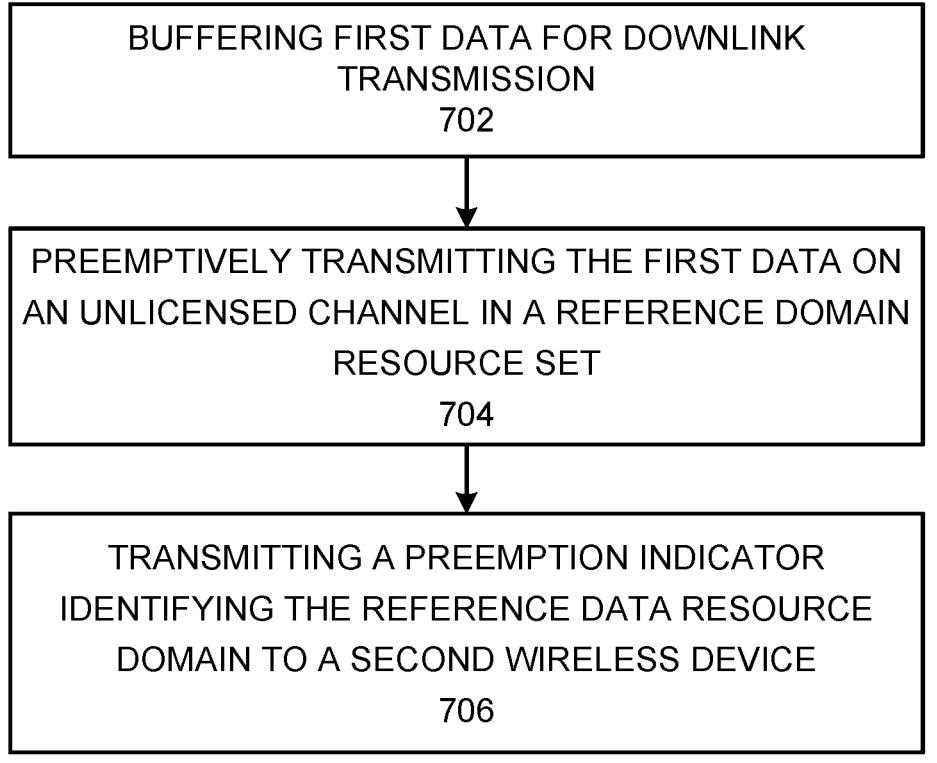

BUFFERING FIRST DATA FOR DOWNLINK
TRANSMISSION
702

PREEMPTIVELY TRANSMITTING THE FIRST DATA ON
AN UNLICENSED CHANNEL IN A REFERENCE DOMAIN
RESOURCE SET
704

TRANSMITTING A PREEMPTION INDICATOR
IDENTIFYING THE REFERENCE DATA RESOURCE
DOMAIN TO A SECOND WIRELESS DEVICE
706

Figure 7

TRANSMITTING A RESOURCE ASSIGNMENT TO THE
SECOND WIRELESS DEVICE IDENTIFYING DOWNLINK
RESOURCES ON THE CHANNEL IN WHICH THE
SECOND DATA WILL BE TRANSMITTED
802

Figure 8

RECEIVING A WIRELESS SIGNAL IN A REFERENCE
DATA RESOURCE DOMAIN IN THE CHANNEL IN
WHICH A SECOND WIRELESS SIGNAL WAS
PREVIOUSLY SCHEDULED FOR TRANSMISSION
902

RECEIVING A PREEMPTION INDICATOR INDICATING
THAT THE WIRELESS SIGNAL WAS TRANSMITTED
PREEMPTIVELY
904

DISCARDING THE FIRST WIRELESS SIGNAL IN
RESPONSE TO THE PI
906

REFERENCE RESOURCE FOR DOWNLINK PREEMPTION IN NR-U

CROSS REFERENCE TO RELATED APPLICATIONS

This application is a 35 U.S.C. § 371 national stage application of PCT International Application No. PCT/SE2021/050274 filed on Mar. 26, 2021, which in turn claims priority to U.S. Provisional Patent Application No. 63/004,015, filed on Apr. 2, 2020, the disclosures and content of which are incorporated by reference herein in their entireties.

BACKGROUND

The present disclosure relates to wireless communication systems. More particularly, the present disclosure relates to wireless communications systems that use unlicensed spectrum in addition to licensed spectrum.

Ultra-reliable and low latency communication (URLLC) is one of the main use cases of the 5G new radio (NR) standard. URLLC has strict requirements for transmission reliability and latency, e.g., 99.9999% reliability within 1 ms one-way latency. In NR Release 15, several new features and enhancements were introduced to support these requirements. In Release 16, standardization work has focused on further enhancing URLLC system performance as well as ensuring reliable and efficient coexistence of URLLC and other NR use cases. One example scenario is when both enhanced mobile broadband (eMBB) and URLLC UEs co-exist in the same cell. Two approaches have been identified to support multiplexing/prioritization in such a situation, namely downlink (DL) preemption and unlicensed spectrum access.

DL Preemption in NR

Once DL URLLC data appears in a buffer, a base station should choose the earliest moment of time when resources can be normally allocated without colliding with the resources allocated for an already ongoing downlink transmission for the corresponding user equipment (UE). This may be either in the beginning of the slot or a mini-slot, where the mini-slot can start at any OFDM symbol. Hence, downlink pre-emption may happen when long term allocation(s) (e.g. slot based) occupy resources (particularly wideband resources) and there is no room for URLLC data transmission, which is typically supported using a mini-slot. In this case, a scheduler can send downlink control information (DCI) to the UE for which the URLLC data is intended and thereby inform that UE that an override (pre-emption) has been triggered for the ongoing downlink transmission. When an eMBB transmission is pre-empted, the pre-empted part of the original message pollutes the soft buffer at the UE that was initially scheduled to receive DL data in the preempted resources (i.e., only noise/interference is received by the receiver). It is therefore important (though not required by the standard) to flush the affected bits from the soft buffer to increase the decodability of the eMBB data at the UE. If not, the pre-empted bits may negatively impact decoding in retransmissions, which will likely happen. NR Release 15 allows a DCI based indication of the pre-emption by explicit signaling, which is carried either by special DCI format 2_1 over group common PDCCH (Option 1) or by a special flag in multi-CBG retransmission DCI (Option 2).

Option 1 gives an indication as a 14-bit bitmap, which addresses reference downlink resource domains in between two pre-emption indication (PI) messages. The reference resource is configured by RRC, where the highest resolution of this signaling in time is 1 OFDM symbol and in frequency is half of the Bandwidth Part (BWP), but not at the same time. The longer the periodicity of messages, the coarser the resolution is. The group common DCI format 2_1 indicates which part of the configured reference resource is pre-empted. Since this is a group common signaling, all UEs within the BWP may read it.

Option 2 is a user specific way of signaling. The HARQ retransmission DCI, which contains a set of CB/CBGs, may have a special bit to indicate that the UE must overwrite existing bits in the soft buffer by retransmitted CB/CBGs soft bits. In this case gNB is responsible for determination the subset of code block (CB)/code block groups (CBGs) that need to be flushed prior to performing the soft-combining process.

NR-U

In addition to operation in licensed bands, NR has been enhanced in 3GPP Release 16 to allow operation in unlicensed bands, i.e., NR-unlicensed (NR-U). Allowing licensed network operators to access unlicensed networks, i.e., networks that operate in unlicensed or shared spectrum to more effectively use the available spectrum is an attractive approach to increase system capacity. As used herein, the term "unlicensed spectrum" may refer to unlicensed and/or shared spectrum.

New Radio (NR) operation in unlicensed spectrum is being standardized in 3GPP Release 16. NR operation in unlicensed spectrum is denoted as NR-U. Operation in unlicensed spectrum is inherently different from operation in licensed spectrum, because the unlicensed spectrum may be shared by multiple networks, including networks operating according to different standards, e.g. LTE-LAA or Wi-Fi.

FIG. 1 illustrates communication between two devices, namely, a base station (BS) 10 and a user equipment (UE) 20 via a licensed channel 12 and an unlicensed channel 14. The licensed channel 12 and the unlicensed channel occupy different frequency bandwidths. That is, the licensed channel 12 falls into frequency spectrum licensed for use by a wireless network operator, such as frequency spectrum from 1.8 to 1.9 GHz, while the unlicensed channel falls into unlicensed spectrum, such as the industrial, scientific and medical (ISM) band from 2.4 to 2.5 GHz.

Although a guiding principle in the NR specification work is to reuse as much as possible from regular NR (i.e. NR operating in licensed spectrum), NR-U will have to conform to the regulatory requirements for operation in unlicensed spectrum. This includes the use of Listen-Before-Talk (LBT) in which a device/node must perform a Clear Channel Assessment (CCA) with a positive outcome (no detected transmission in the unlicensed radio channel/spectrum it intends to transmit in) before it may initiate a transmission.

To perform a CCA, a device (e.g., a UE or base station) monitors the channel for a predetermined time and measures the received energy in the channel. For Wi-Fi, the device checks for preamble transmission indicating the beginning of another device's transmission. To allow a transmission from a device, the received energy must be below a certain threshold (and/or no Wi-Fi preamble must be detected/received above a certain threshold) for the channel to be assessed as clear. The energy detection level threshold may, for example, be −72 dBm, above which the channel is considered busy and the device is required to defer transmission.

After sensing the channel to be idle, the device is typically allowed to transmit for a certain amount of time, sometimes referred to as the Channel Occupancy Time (COT). The maximum allowed length of the COT, or Maximum Channel Occupancy Time (MCOT), depends on regulation and the type of CCA (e.g. for how long time the medium was sensed) that has been performed, and typically ranges from 1 ms to 10 ms. Gaps up to 16 μs are allowed in the transmission without performing an additional CCA. The CCA-free 16 μs gap was introduced to accommodate the turn-around time from reception of a transmission to acknowledgement of the transmission in Wi-Fi.

Although the use of unlicensed spectrum may have some limitations compared to the use of licensed spectrum, solutions that allow an efficient use of unlicensed spectrum as a complement to licensed deployments have the potential to bring great value to the 3GPP operators. Some features in NR need to be adapted to comply with the special characteristics of the unlicensed band as well as to comply with different applicable regulations. Further, if a UE intends to use unlicensed spectrum, it may be required to employ Clear Channel Assessment (CCA) procedures to determine whether the channel is free or not before accessing the spectrum. One such technique is Listen Before Talk (LBT). There are many different variations of LBT depending on which channel access mode the device uses and which type of data it wants to transmit in an upcoming transmission opportunity, referred to as channel occupancy time (COT). For all variations however, the sensing is done in a particular channel (corresponding to a defined carrier frequency) and over a predefined bandwidth.

Further, two modes of access operations are defined—semi-static channel occupancy, corresponding to Frame-Based Equipment (FBE) and dynamic channel occupancy, corresponding to Load-Based Equipment (LBE). In FBE mode, the sensing period is simple, while the sensing scheme in LBE mode is more complex.

Semi-Static Channel Occupancy (FBE Mode)

FIG. 2 illustrates an example of a FBE procedure involving semi-static channel occupancy In FBE mode as defined in 3GPP. As illustrated in FIG. 2, the gNB assigns Fixed Frame Periods (FFP)s. Each FFP is divided into channel occupancy period in which the gNB can potentially transmit and an IDLE period in which the gNB is precluded from transmitting. Just before the FFP boundary, the gNB senses the channel for 9 us in an LBT period. If channel is sensed to be free during the LBT period, the gNB may initiate a downlink transmission at the beginning of the next FFP. The gNB may allocate DL resources among different UEs during the FFP.

This procedure can be repeated with a periodicity based on the FFP duration. Within an FFP, DL/UL transmissions are only allowed within the COT, which includes a subset of FFP resources. The IDLE period following the COT is reserved so that other nodes also have the chance to sense and utilize the channel. Hence in FBE operations, the channel is sensed at specific intervals just before the FFP boundary. The FFP duration can be set to values between 1 and 10 ms. The FFP duration can be changed after a minimum of 200 ms. The IDLE period is a regulatory requirement and is supposed to be at least $T_{IDLE} \geq \max(0.05*COT, 100\ us)$. In 3GPP, this has been simplified to be $T_{IDLE} = \max(0.05*FFP, 100\ us)$. Accordingly, a maximum channel occupancy time (MCOT) may be defined as $T_{MCOT} = \min(0.95*FFP, FFP-0.1\ ms)$. So for a 10 ms FFP, $T_{MCOT}$ would be 9.5 ms, while for a 1 ms FFP, $T_{MCOT}$ would be 0.9 ms=0.9*FFP.

Dynamic Channel Occupancy (LBE Mode)

The default LBT mechanism for LBE operation, LBT category 4, is similar to existing Wi-Fi operation, where a node can sense the channel at any time and start transmitting if the channel is free after a deferral and random backoff period. For specific cases, e.g. shared COT, other LBT categories that provide a very short sensing period are allowed.

SUMMARY

A method by a network node in a wireless communication network according to some embodiments includes buffering first data for downlink transmission to a first wireless device, and preemptively transmitting the first data on a channel that is subject to clear channel assessment, CCA, procedures. The first data is transmitted in a reference downlink resource, RDR, domain in the channel in which second data for a second wireless device was previously scheduled for transmission by the network node, wherein the RDR domain is part of a RDR set that excludes a time period in which the network node is precluded from transmitting downlink data on the channel. The method further includes transmitting a preemption indicator, PI, to the second wireless device, the preemption indicator identifying the RDR domain.

The preemption indicator may include a bitmap that indicates that transmission of the second data to the second wireless device in the RDR domain was preempted.

The RDR domain may fall within a channel occupancy time, COT, of a fixed frame period, FFP, used by the network node to access the channel. The RDR set may exclude an IDLE period within the FFP following the COT. In some embodiments, the RDR set may include a set of continuously numbered RDR parts within the RDR domain, wherein the RDR parts may be outside the IDLE period.

The RDR set may exclude a period reserved for uplink communications on the channel. In some embodiments, the RDR set may exclude a period defined for performing a listen before talk, LBT, procedure by the network node prior to transmitting downlink data.

The period defined for performing LBT may fall within a maximum channel occupancy time, MCOT, of a fixed frame period, FFP, used by the network node to access the channel. The PI may be transmitted on the channel.

The method may further include transmitting a resource assignment to the second wireless device identifying downlink resources on the channel in which the second data will be transmitted. The resource assignment may be transmitted to the second wireless device in a same reference data resource as the PI may be transmitted. The resource assignment may be transmitted to the second wireless device in a different reference data resource from the reference data resource on which the PI may be transmitted. The resource assignment may be transmitted to the second wireless device before the PI may be transmitted.

The RDR set may begin at the start of a FFP, and may end at an end of a FFP. In some embodiments, the RDR set may end at an end of a maximum channel occupancy time, MCOT, of a FFP.

An IDLE period may follows the MCOT in the FFP, where the IDLE period has a duration equal to a larger of 100 microseconds and 5% of the duration of the FFP or a larger of 100 microseconds and 5% of the duration of the MCOT.

The RDR set may be configured using a configuration table having a plurality of rows that correspond to respective RDR domains in the RDR set.

The method may further include provisioning the wireless device with a plurality of configuration tables corresponding to respective fixed frame period lengths.

The RDR set may span across a fixed frame period boundary. In some embodiments, the RDR set may span across an IDLE period between an end of a MCOT and a fixed frame period boundary while excluding the IDLE period.

The RDR set may exclude a listen before talk, LBT, period in the MCOT. In some embodiments, the RDR set may exclude a time period reserved for uplink transmission on the channel.

The method may further include transmitting the second data to the second wireless device in a same or different channel occupancy time, COT as the PI may be transmitted.

The method may further include transmitting a downlink control information, DCI, to the second wireless device, wherein the DCI schedules resources for transmission of the second data.

The channel may include a first multiple input multiple output, MIMO, layer of a plurality of MIMO layers between the network node and the first wireless device. In some embodiments, the transmission of the second data may be not preempted on a second MIMO layer of the plurality of MIMO layers. In some embodiments, the transmission of the second data may be preempted on all of the plurality of MIMO layers.

The PI may be transmitted at the beginning or end of a channel occupancy time, COT, of a fixed frame period, FFP, used by the network node to access the channel. The PI may be transmitted in a same or different COT as the RDR domain is located.

The PI may be transmitted in a second channel that may be different from the channel. The second channel may include a licensed channel.

A radio access network, RAN, node according to some embodiments includes processing circuitry, and memory coupled with the processing circuitry. The memory includes instructions that when executed by the processing circuitry causes the RAN node to perform operations including buffering first data for downlink transmission to a first wireless device, and preemptively transmitting the first data on a channel that is subject to clear channel assessment, CCA, procedures. The first data is transmitted in a reference downlink resource, RDR, domain in the channel in which second data for a second wireless device was previously scheduled for transmission by the network node, and the RDR domain is part of a RDR set that excludes a time period in which the network node is precluded from transmitting downlink data on the channel. The operations further include transmitting a preemption indicator, PI, to the second wireless device, the preemption indicator identifying the RDR domain.

A radio access network, RAN, node according to some embodiments is adapted to perform operations including buffering first data for downlink transmission to a first wireless device, and preemptively transmitting the first data on a channel that is subject to clear channel assessment, CCA, procedures. The first data is transmitted in a reference downlink resource, RDR, domain in the channel in which second data for a second wireless device was previously scheduled for transmission by the network node, and the RDR domain is part of a RDR set that excludes a time period in which the network node is precluded from transmitting downlink data on the channel. The operations further include transmitting a preemption indicator, PI, to the second wireless device, the preemption indicator identifying the RDR domain.

A method by a wireless device in a wireless communication network according to some embodiments includes receiving, from a network node, a first wireless signal on a channel that is subject to clear channel assessment, CCA, procedures. The first wireless signal is transmitted by the network node in a reference downlink resource, RDR, domain in the channel in which a second wireless signal was previously scheduled for transmission by the network node to the wireless device. The RDR domain is part of a RDR set that excludes a time period in which the network node is precluded from transmitting downlink data on the channel. The method further includes receiving a preemption indicator, PI, indicating that the first wireless signal was transmitted in the RDR domain preemptively of the second wireless signal, and discarding the first wireless signal in response to the PI.

The preemption indicator may include a bitmap that indicates that transmission of the second wireless signal to the wireless device in the RDR domain was preempted.

The RDR domain may fall within a channel occupancy time, COT, of a fixed frame period, FFP, used by the network node to access the channel.

The RDR set may exclude an IDLE period within the FFP following the COT.

The RDR set may include a set of continuously numbered RDR parts within the RDR domain, wherein the RDR parts may be outside the IDLE period.

The RDR set may exclude a period reserved for uplink communications on the channel.

The RDR set may exclude a period defined for performing a listen before talk, LBT, procedure by the network node prior to transmitting downlink data.

The period defined for performing LBT may fall within a maximum channel occupancy time, MCOT, of a fixed frame period, FFP, used by the network node to access the channel. The PI may be transmitted on the channel.

The method may further include receiving a resource assignment identifying downlink resources on the channel in which the second wireless signal will be transmitted. The resource assignment may be received in a same reference data resource as the PI may be received. The resource assignment may be received in a different reference data resource from the reference data resource on which the PI may be received. The resource assignment may be received before the PI may be received.

The RDR set may begin at the start of a fixed frame period, FFP, and may end at an end of a FFP. The RDR set may end at an end of a maximum channel occupancy time, MCOT, of a FFP.

An IDLE period may follow the MCOT in the FFP. The IDLE period may have a duration equal to a larger of 100 microseconds and 5% of the duration of the FFP or a larger of 100 microseconds and 5% of the duration of the MCOT.

The RDR set may be configured using a configuration table having a plurality of rows that correspond to respective RDR domains in the RDR set.

The method may further include receiving a message provisioning the wireless device with a plurality of configuration tables corresponding to respective fixed frame period lengths.

The RDR set may span across a fixed frame period boundary. The RDR set may span across an IDLE period between an end of a maximum channel occupancy time, MCOT and a fixed frame period boundary while excluding the IDLE period.

The RDR set may exclude a listen before talk, LBT, period in the MCOT. The RDR set may exclude a time period reserved for uplink transmission on the channel.

The method may further include receiving the second wireless signal in a same or different channel occupancy time, COT as the PI may be received.

The method may further include transmitting a downlink control information, DCI, to the wireless device scheduling resources for transmission of the second wireless signal.

The channel may include a first multiple input multiple output, MIMO, layer of a plurality of MIMO layers between the network node and the wireless device. Transmission of the second wireless signal may be not preempted on a second MIMO layer of the plurality of MIMO layers. Transmission of the second wireless signal may be preempted on all of the plurality of MIMO layers.

The PI may be received at the beginning or end of a channel occupancy time, COT, of a fixed frame period, FFP, used by the network node to access the channel.

The PI may be received in a same channel occupancy time, COT, or a different COT as the RDR domain is located.

The PI may be received in a second channel that is different from the first channel. The second channel may include a licensed channel.

A wireless device according to some embodiments include processing circuitry and memory coupled with the processing circuitry. The memory includes instructions that when executed by the processing circuitry causes the wireless device to perform operations including receiving, from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel, receiving a preemption indicator, PI, indicating that the first wireless signal was transmitted in the RDR domain preemptively of the second wireless signal, and discarding the first wireless signal in response to the PI.

A wireless device according to some embodiments is adapted to perform operations including receiving, from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel, receiving a preemption indicator, PI, indicating that the first wireless signal was transmitted in the RDR domain preemptively of the second wireless signal, and discarding the first wireless signal in response to the PI.

Some embodiments described herein may enable more efficient use of network resources, and in particular may help to facilitate ultra-reliable low latency communications by preemptively transmitting data on channels that are subject to CCA procedures.

BRIEF DESCRIPTION OF THE DRAWINGS

FIGS. 7 and 8 are flowcharts of operations performed by a base station according to some embodiments.

DETAILED DESCRIPTION OF EMBODIMENTS

Figure 1:
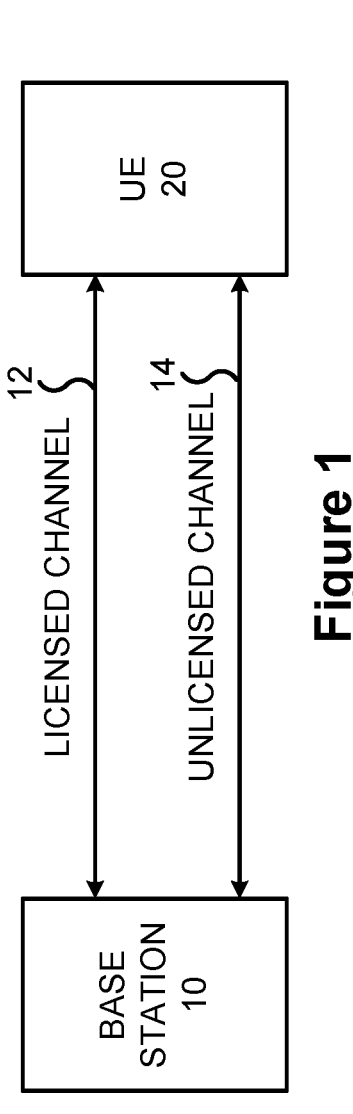
FIG. 1 is a schematic block diagram that illustrates communications between a base station and a wireless device using licensed spectrum and unlicensed spectrum.
Figure 2:
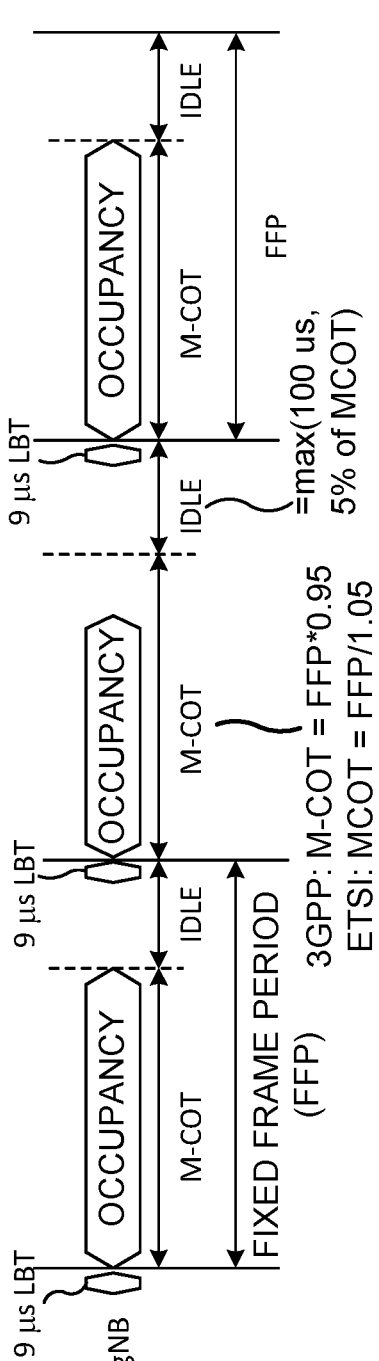
FIG. 2 illustrates timing of fixed frame periods in downlink transmission by a base station.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "node" can be a network node, base station, UE, or other wireless device. Examples of network nodes are NodeB, base station (BS), multi-standard radio (MSR) radio node such as MSR BS, eNodeB, gNodeB, MeNB, SeNB, integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, RRU, RRH, nodes in distributed antenna system (DAS), core network node (e.g. MSC, MME etc), O&M, OSS, SON, positioning node (e.g. E-SMLC), etc. Another example of a node could be user equipment (UE), which refers to any type of wireless device communicating with a network node and/or with another UE in a cellular or mobile communication system. Examples of UE are a target device, device to device (D2D) UE, vehicular to vehicular (V2V), machine type UE, MTC UE or UE capable of machine to machine (M2M) communication, PDA, Tablet, mobile terminals, smart phone, laptop embedded equipment (LEE), laptop mounted equipment (LME), USB dongle, etc.

In some embodiments, generic terms, such as "radio network node," "radio access network node," or simply "network node (NW node)", are used. These terms can refer to any kind of network node, including a base station, radio base station, base transceiver station, base station controller, network controller, evolved Node B (eNB), Node B, gNodeB (gNB), relay node, access point, radio access point, Remote Radio Unit (RRU) Remote Radio Head (RRH), Central Unit (e.g. in a gNB), Distributed Unit (e.g. in a gNB), Baseband Unit, Centralized Baseband, C-RAN, access point (AP etc.

The term radio access technology, or RAT, may refer to any wireless communication technology, such as UTRA, E-UTRA, narrow band internet of things (NB-IoT), WiFi, Bluetooth, next generation RAT, New Radio (NR), 4G, 5G, etc. Any of the equipment denoted by the terms node, network node or radio network node may be capable of supporting a single or multiple RATs.

The term signal used herein can be any physical signal or physical channel. Examples of physical signals are reference signal such as PSS, SSS, CSI-RS, DMRS, signals in SSB, DRS, CRS, PRS etc. The term physical channel (e.g., in the context of channel reception) used herein is also called "channel". Examples of physical channels are PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH etc.

The term "LBT" as used herein may correspond to any type of carrier sense multiple access (CSMA) procedure or mechanism which is performed by a node on a carrier before deciding to transmit signals on that carrier. CSMA or LBT may also interchangeably be called clear channel assessment (CCA), clear channel determination etc. The transmission of signals on a carrier subjected to LBT is also called contention-based transmission. On the other hand, the transmission of signals on a carrier which is not subjected to LBT is also called contention free transmission.

The term clear channel assessment (CCA) used herein may correspond to any type of carrier sense multiple access (CSMA) procedure or mechanism which is performed by the device on a carrier before deciding to transmit signals on that carrier. The CCA is also interchangeably called CSMA scheme, channel assessment scheme, listen-before-talk (LBT) etc. The CCA based operation is more generally called contention-based operation. The transmission of signals on a carrier subjected to CCA is also called contention-based transmission. The contention-based operation is typically used for transmission on carriers of unlicensed frequency band. But this mechanism may also be applied for operating on carriers belonging to licensed band for example to reduce interference. The transmission of signals on a carrier which is not subjected to CCA is also called contention free transmission.

The preemption techniques described above are standardized for NR for DL transmission on licensed spectrum. Similar techniques can be utilized for NR-U, i.e., preemption can be applied to resources on unlicensed spectrum/channels. However, this may require some modification, as NR-U stipulates the use of CCA procedures such as LBT before commencing a DL transmission. Some embodiments described herein provide systems and/or methods for DL preemption on unlicensed spectrum/channel.

Figure 3:
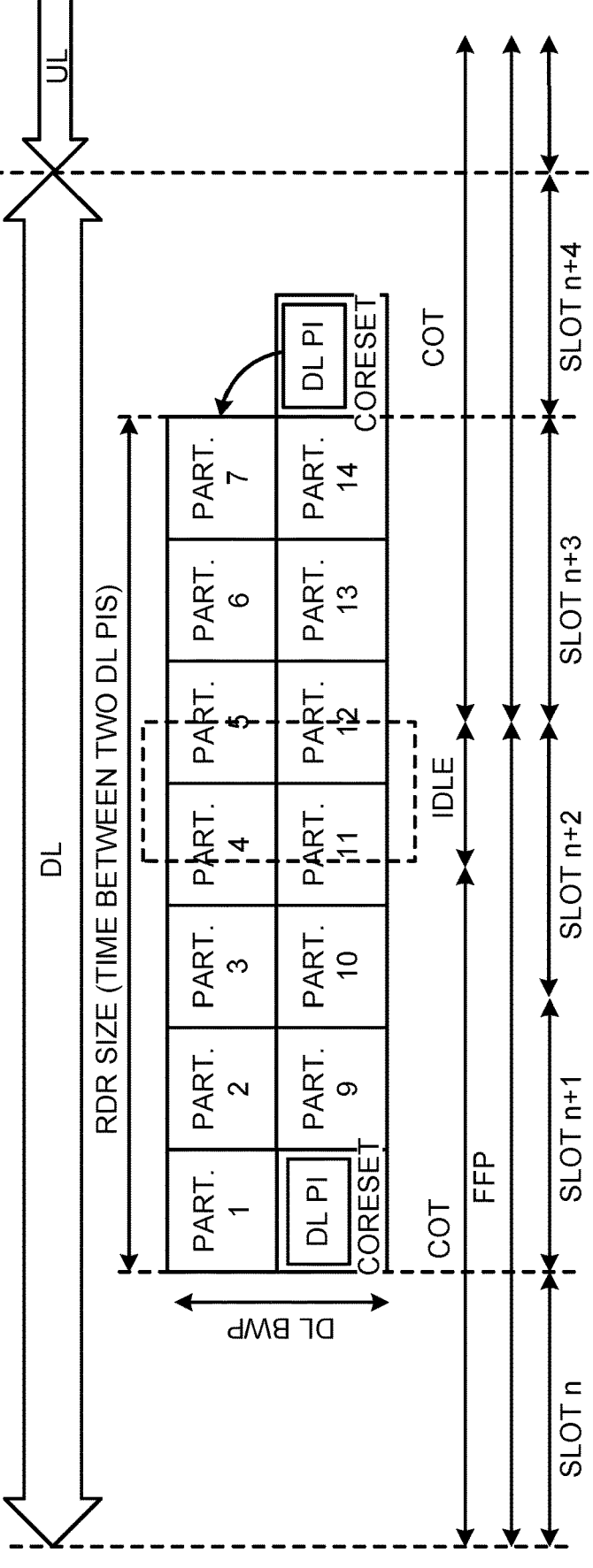
FIG. 3 illustrates an overlay of a resource domain resource with an IDLE period in a channel subject to clear channel assessment procedures.

FIG. 3 illustrates a problem with unmodified implementation of NR preemption techniques in NR-U systems. FIG. 3 illustrates a DL Bandwidth Part (BWP) in which a reference downlink resource (RDR) is defined. For purposes of handling preemption, the RDR is partitioned into a plurality of RDR domains, shown in FIG. 3 as partitions 1 to 14. Because an RDR comprises a plurality of RDR domains, an RDR may be referred to herein as an "RDR set." Each RDR set includes a control resource set (CORE-SET) that may carry a preemption indicator, PI. When a DL transmission that is scheduled for a particular RDR domain is preempted, the preemption is indicated in the DL PI following the RDR set containing the preempted RDR domain. Accordingly, the DL PI in an RDR set points back to the previous RDR set.

When a UE and gNB implement partitioning of an RDR set, an IDLE period and one or more LBT period(s) (which are introduced in NR-U for semi-static channel occupancy with semi-static COT/IDLE period) may be included in the RDR set. Thus, the RDR set may cover time periods in which the gNB is unable to transmit DL signals. In other words, in the IDLE part of the FFP, there is no DL transmission, and therefore there is no need to include the IDLE part in the RDR set. The LBT periods before the COT are included in the IDLE period. However, LBT periods could also be within the COT, such as when there is COT sharing, i.e. switching from DL to UL during a COT. COT sharing can also happen between different uplink transmissions from different UEs. The gap including the LBT resources between DL and UL transmission should also be considered.

According to some embodiments, RDR sets are defined for use with NR-U that exclude resources that are unavailable for DL transmission, such as resources corresponding to the IDLE period following the COT, LBT resources, and resources reserved for UL transmission Furthermore, some embodiments provide techniques for DL PI monitoring during an FFP, since the UE does not expect any DL signal during IDLE/LBT/UL periods.

Figure 4:
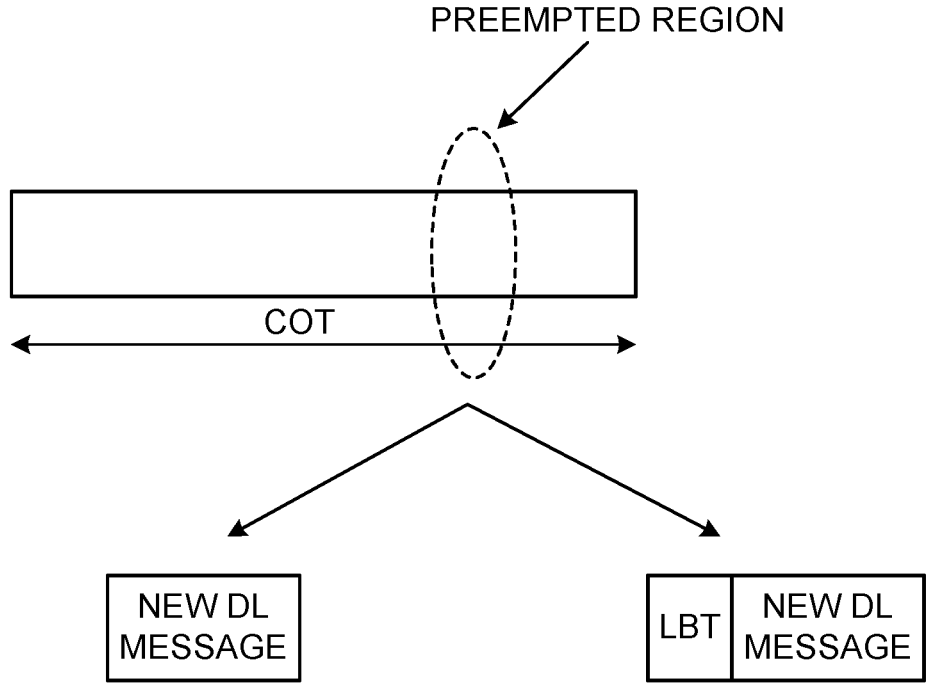
FIG. 4 illustrates preemption of downlink transmissions during a channel occupancy time.

An example of DL procedure on an unlicensed channel is depicted in FIG. 4 with two options. The left side of FIG. 4 illustrates preemption of a DL transmission is preempted where a new transmission is allowed without the need to perform an LBT before the transmission. For example, this can happen if, prior to the new transmission, the gNB is already transmitting with a time-gap less than 16 us between transmissions, or the UE is transmitting UL data and the time-gap between UL and DL transmissions is less than 16 us. However, as shown on the right side of FIG. 4, if the time-gap following the last transmission before the transmission is larger than 16 us, then LBT is required by the gNB before the DL transmission uses the preempted resources.

As noted above, using the Preemption indicator (PI), the gNB indicates to a UE or group of UEs, by means of a DCI, that the referenced transmission has been preempted. The PI is transmitted after the interrupted (preempted) transmission. That is, the PI may trigger a previously scheduled UE or group of UEs to discard a previously received signal that was originally scheduled for DL transmission for the UE or group of UEs but that was preempted for transmission of DL data to another UE.

The gNB may also transmit a preempted resource assignment to the UE or group of UEs that were preempted. In this signaling, the gNB indicates, to a preempted UE or group of UEs, a DL assignment that schedules transmission of the preempted data. In some cases, this assignment may act like a normal scheduling command. For the assigned DL resource (which is allocated for new transmission), LBT may or may not be needed depending on the time-gap between the gNB's latest transmission and the assigned DL resource. The preempted transmission and the new scheduling command over the preempted resource can belong to the same UE or different UEs. The scheduling assignment may be carried in a same or different CORESET or RDR domain as the PI. That is, the PI and the scheduling assignment can be transmitted jointly or separately in any order, irrespective of NR spectrum scenarios being licensed or unlicensed. In particular embodiments, the scheduling assignment is provided jointly along with the PI to the preempted UE or group of UEs.

According to some embodiments, a method by a network node in a wireless communication network is provided. When the network node buffers data for transmission to a UE, the network node may decide to transmit the data preemptively using resources that were previously assigned to a different UE or group of UEs. The network node preemptively transmits the data on an unlicensed channel, that is, a channel that is subject to clear channel assessment, CCA, procedures. The data is transmitted in a reference downlink resource, RDR, domain in the channel in which second data for a second wireless device was previously scheduled for transmission by the network node. The RDR domain is part of an RDR set that excludes a time period in which the network node is precluded from transmitting downlink data on the channel. The network node then transmits a preemption indicator, PI, to the second wireless device identifying the RDR domain that was preempted.

Figures 5, 6:
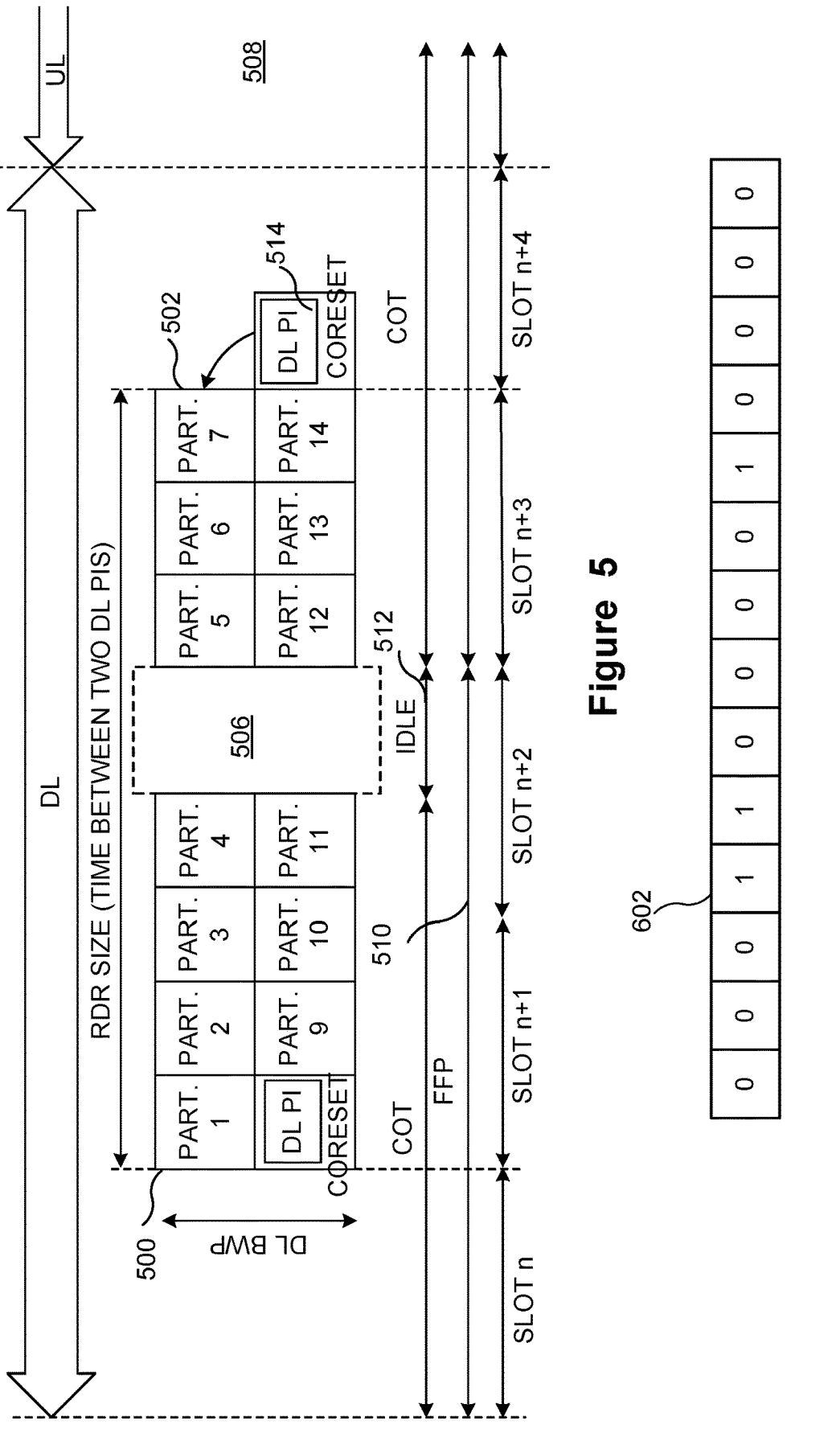
FIG. 5 illustrates a resource downlink resource configured accordance with some embodiments.
FIG. 6 illustrates a bitmap that can be used to indicate preempted resources in a preemption indicator in accordance with some embodiments.

An example of an arrangement of an RDR set that excludes a time period in which the network node is precluded from transmitting downlink data is shown in FIG. 5. As shown therein, an RDR set 500 includes RDR domains 502, shown as partitions 1 to 14. The RDR set 500 excludes a time period 506 corresponding to the IDLE period 512 within a FFP 510 used by the gNB to transmit/receive DL/UL transmissions on unlicensed spectrum. The RDR set 500 also excludes resources falling within a time period 508 reserved for UL transmissions. Preemption of one of the RDR domains 502 is indicated in a PI 514 transmitted in a subsequent RDR set.

Some further embodiments are performed by a wireless device whose scheduled DL transmission was preempted. In particular, in some embodiments, a wireless device in a wireless communication network receives, from a network node, a wireless signal on an unlicensed channel, i.e., a channel that is subject to CCA procedures. The wireless signal is transmitted by the network node in an RDR, domain in the channel in which a second wireless signal was previously scheduled for transmission by the network node to the wireless device. Because the wireless signal received by the wireless device was not intended for the wireless device, the wireless device would be unable to successfully decode the wireless signal. However, under normal circumstances, the wireless device would retain the wireless signal in its buffer for soft combining with subsequently received signals, The RDR domain is part of a RDR set that excludes a time period in which the network node is precluded from transmitting downlink data on the channel. The wireless device then receives a preemption indicator, PI, indicating that the wireless signal was transmitted in the RDR domain preemptively of the second wireless signal. The wireless device then discards the first wireless signal in response to the PI, such as by flushing the first wireless signal from its receive buffer.

Referring to FIGS. 5 and 6, the PI 514 may carry a bitmap 602 that indicates which RDR domain(s) were preempted. That is, each bit in the bitmap may correspond to an RDR domain 502 in the previous RDR set 500. A '1' in the bitmap 602 may indicate that the corresponding RDR domain 502 was preempted and a '0' may indicate that the corresponding RDR domain 502 was not preempted, or vice-versa. By examining the bitmap 602, the UE receiving the PI 514 may be able to determine that a DL transmission received by the UE was preempted and thus should be discarded.

As noted above, when using unlicensed spectrum, certain resources cannot be used for transmission, such as resources in the IDLE period during the end of FFP, as shown in FIG. 3. Therefore, the procedure for allocating an RDR set should consider LBT specific procedures to make time granularity of the PI more accurate. In some embodiments, the RDR set may span over T time units (slots or symbols) before the beginning of a PI. If the RDR spans over more than one FFP, one or more options can be applied. For example, the RDR may start from the beginning of frame period, the RDR may end at the end of current frame period, and/or the RDR may end at the end of current FFP minus defined IDLE period, e.g. maximum of 100 us and 5% of FFP or 5% of COT. For usage in 3GPP, 5% of FFP is recommended. The duration of the IDLE period can be derived either from system parameters, e.g. configured value of FFP, or from regulation rules for a specific band.

Regarding IDLE time periodicity, the FFP length can vary, and hence the periodicity of IDLE time resource can change accordingly. For example, an IDLE time for a 1 ms FFP length would be much more frequent than for a 10 ms FFP, but also shorter. Hence, a gNB can create a table for allowed resources for preemption which can depend on what FFP length gNB is utilizing. For example, if a gNB has the ability to allocate three types of FFP lengths—1 ms or 2 ms or 10 ms for allocation purposes, then it can create three tables in its database that store the allowed resources for preemption, because the "IDLE time" periodicity or occurrences for different FFPs would be different, and these IDLE time resources would be excluded from the table. Alternatively, the tables can be constructed on the fly, and the RDR configuration may be signaled to the UE via RRC.

Whenever a gNB preempts a transmission, it can send row ID of the table the PI (which could be in DCI or in an RRC message) that is bit-mapped to the resource of the preempted transmission indicated by the given row ID of the table.

Further, the FFP length may change after each 200 ms, so another table may be used to delineate the exclusion of resources corresponding to the IDLE time period. Such a table may be determined based on the configured FFP length. This may happen, for example, in group-common PDCCH.

In Release 16, FFP length is configured in a system information block (SIB), so it cannot change dynamically. However, group-common PDCCH can be utilized to make FFP length dynamic.

In some embodiments, the resources excluded from the RDR set can be resources in which LBT is performed. The LBT resources can be categorized in two classes: (a) LBT resources that are in the IDLE period which are at the end of the FFP, and (b) LBT resources or LBT restrictions that may occur during the COT. In some embodiments, the RDR set can exclude all pauses and gaps introduced by unlicensed operation (e.g., gaps for LBT within the COT, IDLE periods etc.).

In some embodiments, the RDR set can include all pauses and gaps introduced by unlicensed operation (gaps for LBT, IDLE periods etc.). The LBT resource can be meant for gNB or UE. The preempted resource assignment will in this case not include the resources coinciding with the IDLE period/gaps.

In some embodiments, in FBE operation, an RDR can span across frame periods or FFPs. In that case, LBT gaps in the COT can be excluded from reference resource, and/or IDLE periods can be excluded from reference resource, or In other embodiments, the resources excluded by the RDR set can be resources where symbols or slots are allocated for UL transmission, such as UL resources at the beginning of the frame boundary.

In some embodiments, a gNB may postpone the pre-empted transmission. That is, the gNB may transmit the interrupted DL transmission after the interrupted resource in the same or another COT. The PI may include an indication that the preempted resources will be transmitted immediately. In some embodiments, the PI may include new scheduling resources for the preempted DL transmission.

In some embodiments, if a UE is scheduled to receive multiple repetitions in DL (slot-aggregation) or to receive multiple antenna panel transmissions, Multi-TRP, (e.g. repetition of the same transport block or transmission of multiple transport blocks via multiple antenna panels) and it receives PI with indicated reference resource, then various options are possible. For example, in some cases, each repetition or transmission may be pre-empted individually to the extent they intersect with pre-empted partitions in the RDR set.

If a UE receives two or more transmissions via multiple MIMO layers initiated from different antenna panels or gNBs (Multi-TRP), then transmissions in all MIMO layers may be pre-empted or only a sub-set of transmissions may be preempted.

In some embodiments, the configuration of RDR sets, including time and frequency regions, and the time and frequency granularities are adapted to the FFP or maximum COT. As one example the duration of the reference region in the time domain may be set to be at most equal to the maximum COT in the cell. The reason can be that, e.g., a preemption reference time beyond the maximum COT is not useful, since the UE needs to be able to monitor at least one preemption DCI (PI), and therefore the maximum COT must be larger than the RDR set in the time domain, and the preemption DCI that follows directly after the RDR set must at least cover the monitoring occasion for the preemption DCI.

In other embodiments, the monitoring occasions for DL preemption DCI may be adapted to the FFP and or MCOT, i.e. e.g. IDLE periods following the MCOT may be excluded from monitoring.

In other embodiments, the PI monitoring occasion may be shifted by an offset relative to the IDLE period to guarantee that PI monitoring occasion and the IDLE period in FFP do not overlap. In another embodiment the PI monitoring periodicity may be set as an integer multiple of the FFP, which may avoid collision between PI occasions and IDLE periods. Similarly, in other embodiments, the FFP may be set as an integer multiple of a PI monitoring period.

In another embodiment if some of the PI monitoring occasion overlap with the IDLE period, the UE is not required to monitor PI in those occasions.

Any of the embodiments described herein can be enabled/disabled by higher layer signaling.

In some embodiments, the PI transmission behavior can be defined according to one or more of the following options: the PI may be transmitted in the beginning of a COT as shown in FIG. 5, LBT may be required prior to transmitting the PI, and/or the PI may be transmitted in another part of the COT where the first transmission in the COT is not PI. PI is not transmitted in the UL symbols, or IDLE periods, or LBT gaps in the COT.

In some embodiments, PI may always be transmitted in the same COT for which DL transmissions are preempted, i.e., both PI transmissions and preempted DL transmissions occur in the same COT).

In some embodiments, PI may be sent to indicate pre-empted DL transmissions of previous COTs, i.e., PI transmission and preempted DL transmissions occur in different COTs.

In some embodiments, the RDR set indicates valid DL resources for combined NR and NR-U resources. For example, RDR set may exclude IDLE periods from NR-U resource and UL symbols/slots from both NR and NR-U resources.) As used herein "NR resource" refers to a licensed resource and "NR-U resource" refers to an unlicensed resource. In some embodiments, the DL PI may always be sent on an NR resource for indicating preempted DL resource over NR-U resource or mix of NR and NR-U resources. In some embodiments, the DL PI may always be sent on NR-U resource for indicating preempted DL resource over NR-U resource or mix of NR and NR-U resource. In some embodiments, the DL PI may always be sent at the end of the COT.

Referring to FIG. 7, a method by a network node in a wireless communication network is illustrated. The method includes buffering (block 702) first data for downlink transmission to a first wireless device and preemptively transmitting (block 704) the first data on a channel that is subject to clear channel assessment, CCA, procedures. The first data is transmitted in a reference downlink resource, RDR, domain in the channel in which second data for a second wireless device was previously scheduled for transmission by the network node. The RDR domain is part of a RDR set that excludes a time period in which the network node is precluded from transmitting downlink data on the channel. The network node transmits (block 706) a preemption indicator, PI, to the second wireless device. The preemption indicator identifying the RDR domain.

In some embodiments, the preemption indicator includes a bitmap that indicates that transmission of the second data to the second wireless device in the RDR domain was preempted.

The RDR domain may fall within a channel occupancy time, COT, of a fixed frame period, FFP, used by the network node to access the channel.

In some embodiments, the RDR set excludes an idle period within the FFP following the COT. In some embodiments, the RDR set excludes a period reserved for uplink communications on the channel. In some embodiments, the RDR set excludes a period defined for performing a listen before talk, LBT, procedure by the network node prior to transmitting downlink data.

In some embodiments, the period defined for performing LBT falls within a maximum channel occupancy time, MCOT, of a fixed frame period, FFP, used by the network node to access the channel. In some embodiments, the PI is transmitted on the channel.

Referring to FIG. 8, in some embodiments, the method further includes transmitting (block 802) a resource assignment to the second wireless device identifying downlink resources on the channel in which the second data will be transmitted. In some embodiments, the resource assignment is transmitted to the second wireless device in a same reference data resource as the PI is transmitted. In some embodiments, the resource assignment is transmitted to the second wireless device in a different reference data resource from the reference data resource on which the PI is transmitted. In some embodiments, the resource assignment is transmitted to the second wireless device before the PI is transmitted.

In some embodiments, the RDR set begins at the start of a fixed frame period, FFP. In some embodiments, the RDR set ends at an end of a fixed frame period, FFP. In some embodiments, the RDR set ends at an end of a maximum channel occupancy time, MCOT, of a fixed frame period, FFP.

In some embodiments, an IDLE period follows the MCOT in the FFP, where in the IDLE period has a duration equal to a larger of 100 microseconds and 5% of the duration of the FFP or a larger of 100 microseconds and 5% of the duration of the MCOT.

In some embodiments, the RDR set is configured using a configuration table having a plurality of rows that correspond to respective RDR domains in the RDR set.

In some embodiments, the method further includes provisioning the wireless device with a plurality of configuration tables corresponding to respective fixed frame period lengths.

In some embodiments, the RDR set spans across a fixed frame period boundary. In some embodiments, the RDR set spans across an IDLE period between an end of a maximum channel occupancy time, MCOT and a fixed frame period boundary while excluding the IDLE period. In some embodiments, the RDR set excludes a listen before talk, LBT, period in the MCOT. In some embodiments, the RDR set excludes a time period reserved for uplink transmission on the channel.

In some embodiments, the method further includes transmitting the second data to the second wireless device in a same or different channel occupancy time, COT as the PI is transmitted. In some embodiments, the method further includes transmitting a downlink control information, DCI, to the second wireless device, wherein the DCI schedules resources for transmission of the second data.

In some embodiments, the channel includes a first multiple input multiple output, MIMO, layer of a plurality of MIMO layers between the network node and the first wireless device. In some embodiments, transmission of the second data is not preempted on a second MIMO layer of the plurality of MIMO layers. In some embodiments, transmission of the second data is preempted on all of the plurality of MIMO layers.

In some embodiments, the PI is transmitted at the beginning of a channel occupancy time, COT, of a fixed frame period, FFP, used by the network node to access the channel. In some embodiments, the PI is transmitted at the end of a channel occupancy time, COT, of a fixed frame period, FFP, used by the network node to access the channel. In some embodiments, the PI is transmitted in a same channel occupancy time, COT, as the RDR domain is located. In some embodiments, the PI is transmitted in a different channel occupancy time, COT, as the RDR domain is located. In some embodiments, the PI is transmitted in a second channel that is different from the channel. The second channel may include a licensed channel.

Figure 10:
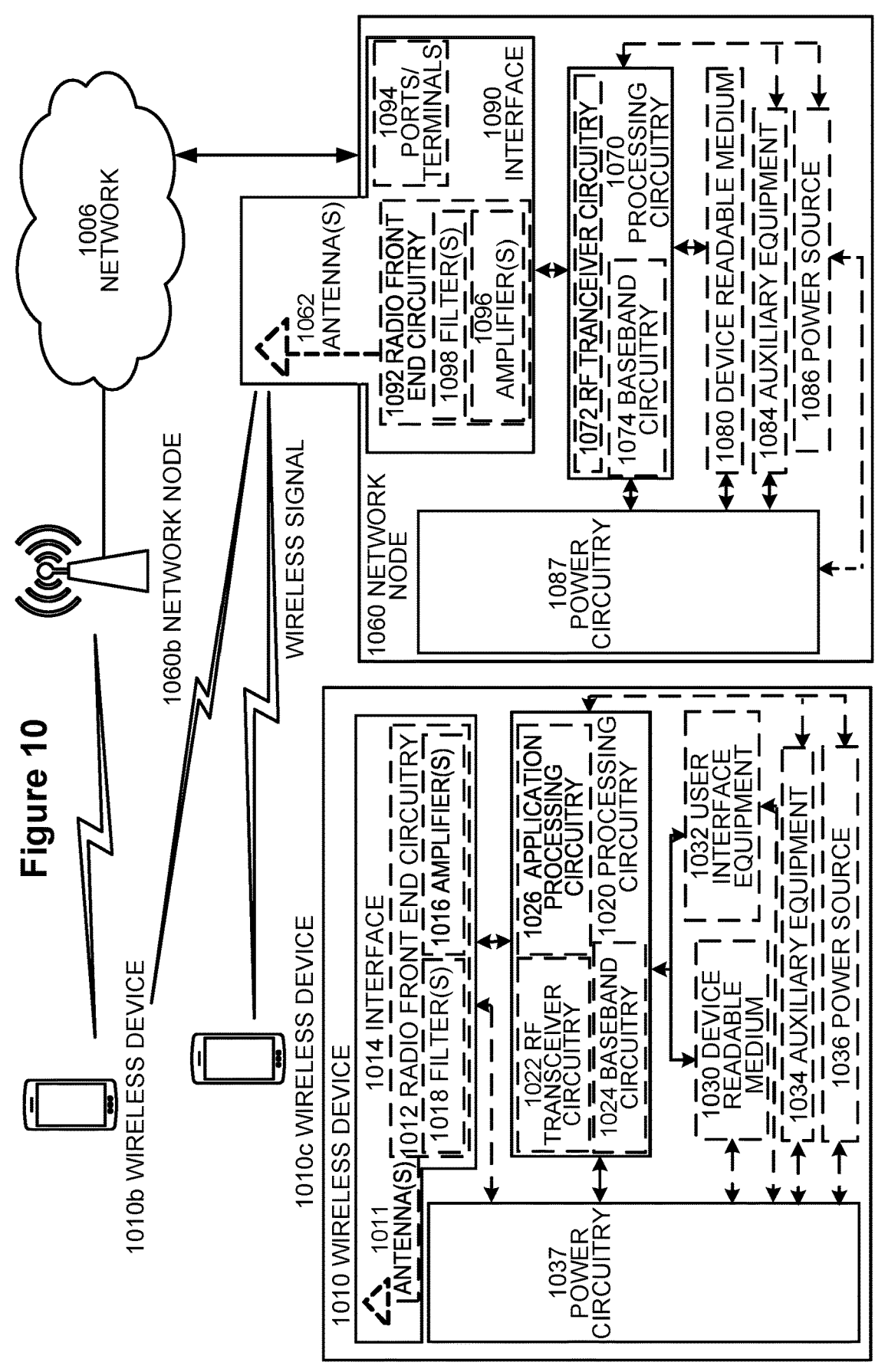
FIG. 10 is a block diagram of a wireless network in accordance with some embodiments.

Referring to FIGS. 7 and 10, a radio access network, RAN, node (1060) according to some embodiments includes processing circuitry (1070), and memory (1080) coupled with the processing circuitry, wherein the memory includes instructions that when executed by the processing circuitry causes the RAN node to perform operations including buffering (block 702) first data for downlink transmission to a first wireless device; preemptively transmitting (block 704) the first data on a channel that is subject to clear channel assessment, CCA, procedures, wherein the first data is transmitted in a reference downlink resource, RDR, domain in the channel in which second data for a second wireless device was previously scheduled for transmission by the network node, wherein the RDR domain is part of a RDR set that excludes a time period in which the network node is precluded from transmitting downlink data on the channel; and transmitting (block 706) a preemption indicator, PI, to the second wireless device, the preemption indicator identifying the RDR domain.

Referring to FIGS. 7 and 10, some embodiments provide a radio access network, RAN, node (1060) adapted to perform operations including buffering (block 702) first data for downlink transmission to a first wireless device; preemptively transmitting (block 704) the first data on a channel that is subject to clear channel assessment, CCA, procedures, wherein the first data is transmitted in a reference downlink resource, RDR, domain in the channel in which second data for a second wireless device was previously scheduled for transmission by the network node, wherein the RDR domain is part of a RDR set that excludes a time period in which the network node is precluded from transmitting downlink data on the channel; and transmitting (block 706) a preemption indicator, PI, to the second wireless device, the preemption indicator identifying the RDR domain.

Figure 9:
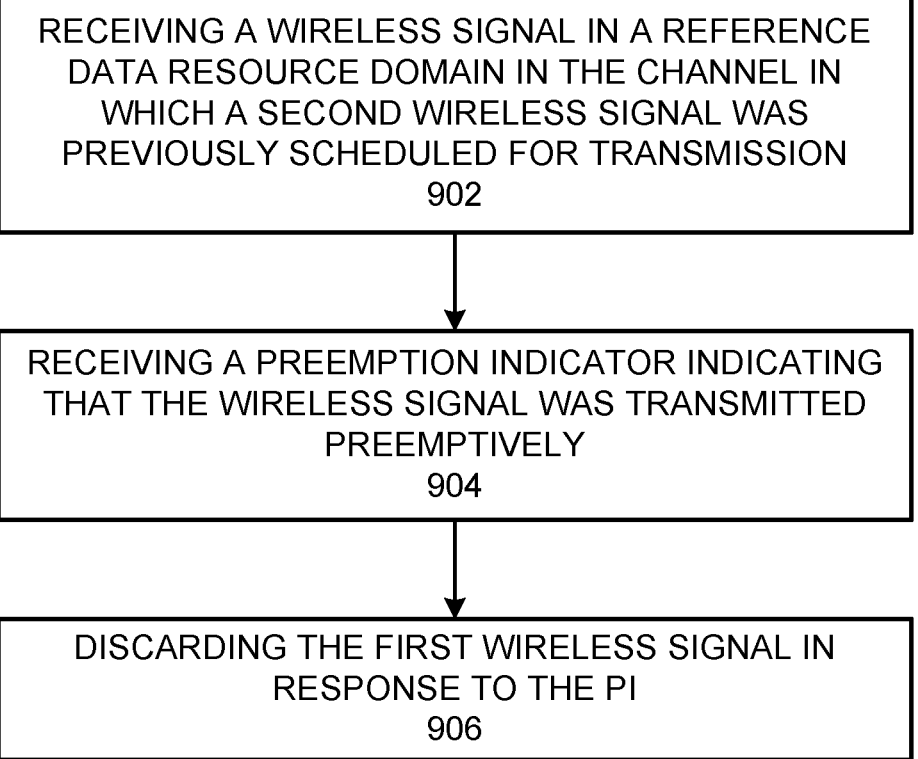
FIG. 9 is a flowchart of operations performed by a UE according to some embodiments.

Referring to FIG. 9, a method by a wireless device in a wireless communication network includes receiving (block 902), from a network node, a first wireless signal on a channel that is subject to clear channel assessment, CCA, procedures. The first wireless signal is transmitted by the network node in a reference downlink resource, RDR, domain in the channel in which a second wireless signal was previously scheduled for transmission by the network node to the wireless device. The RDR domain is part of a RDR set that excludes a time period in which the network node is precluded from transmitting downlink data on the channel. The method further includes receiving (block 904) a preemption indicator, PI, indicating that the first wireless signal was transmitted in the RDR domain preemptively of the second wireless signal, and discarding (block 906) the first wireless signal in response to the PI.

In some embodiments, the preemption indicator includes a bitmap that indicates that transmission of the second wireless signal to the wireless device in the RDR domain was preempted.

In some embodiments, the RDR domain falls within a channel occupancy time, COT, of a fixed frame period, FFP, used by the network node to access the channel. In some embodiments, the RDR set excludes an IDLE period within the FFP following the COT. In some embodiments, the RDR set excludes a period reserved for uplink communications on the channel. In some embodiments, the RDR set excludes a period defined for performing a listen before talk, LBT, procedure by the network node prior to transmitting downlink data.

In some embodiments, the period defined for performing LBT falls within a maximum channel occupancy time, MCOT, of a fixed frame period, FFP, used by the network node to access the channel. In some embodiments, the PI is transmitted on the channel.

In some embodiments, the method may further include receiving a resource assignment identifying downlink resources on the channel in which the second wireless signal will be transmitted. In some embodiments, the resource assignment is received in a same reference data resource as the PI is received. In some embodiments, the resource assignment is received in a different reference data resource from the reference data resource on which the PI is received. In some embodiments, In some embodiments, the resource assignment is received before the PI is received.

In some embodiments, the RDR set begins at the start of a fixed frame period, FFP. In some embodiments, the RDR set ends at an end of a fixed frame period, FFP. In some embodiments, the RDR set ends at an end of a maximum channel occupancy time, MCOT, of a fixed frame period, FFP.

In some embodiments, an IDLE period follows the MCOT in the FFP, where in the IDLE period has a duration equal to a larger of 100 microseconds and 5% of the duration of the FFP or a larger of 100 microseconds and 5% of the duration of the MCOT.

In some embodiments, the RDR set is configured using a configuration table having a plurality of rows that correspond to respective RDR domains in the RDR set.

In some embodiments, the method further includes receiving a message provisioning the wireless device with a plurality of configuration tables corresponding to respective fixed frame period lengths.

In some embodiments, the RDR set spans across a fixed frame period boundary. In some embodiments, the RDR set spans across an IDLE period between an end of a maximum channel occupancy time, MCOT and a fixed frame period boundary while excluding the IDLE period.

In some embodiments, the RDR set excludes a listen before talk, LBT, period in the MCOT. In some embodiments, the RDR set excludes a time period reserved for uplink transmission on the channel.

In some embodiments, the method further includes receiving the second wireless signal in a same or different channel occupancy time, COT as the PI is received.

In some embodiments, the method further includes transmitting a downlink control information, DCI, to the wireless device scheduling resources for transmission of the second wireless signal.

In some embodiments, the channel includes a first multiple input multiple output, MIMO, layer of a plurality of MIMO layers between the network node and the wireless device. In some embodiments, transmission of the second wireless signal is not preempted on a second MIMO layer of the plurality of MIMO layers. In some embodiments, transmission of the second wireless signal is preempted on all of the plurality of MIMO layers.

In some embodiments, the PI is received at the beginning of a channel occupancy time, COT, of a fixed frame period, FFP, used by the network node to access the channel.

In some embodiments, the PI is received at the end of a channel occupancy time, COT, of a fixed frame period, FFP, used by the network node to access the channel.

In some embodiments, the PI is received in a same channel occupancy time, COT, as the RDR domain is located. In some embodiments, the PI is received in a different channel occupancy time, COT, as the RDR domain is located. In some embodiments, the PI is received in a second channel that is different from the first channel. In some embodiments, second channel includes a licensed channel.

Referring to FIGS. 9 and 10, a wireless device (1010) according to some embodiments includes processing circuitry (1020) and memory (1030) coupled with the processing circuitry. The memory includes instructions that when executed by the processing circuitry causes the wireless device to perform operations including receiving (block 902), from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel, receiving (block 904) a preemption indicator, PI, indicating that the first wireless signal was transmitted in the RDR domain preemptively of the second wireless signal, and discarding (block 906) the first wireless signal in response to the PI.

Referring to FIGS. 9 and 10, some embodiments provide a wireless device (1010) adapted to perform operations including receiving (block 902), from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel, receiving (block 904) a preemption indicator, PI, indicating that the first wireless signal was transmitted in the RDR domain preemptively of the second wireless signal, and discarding (block 906) the first wireless signal in response to the PI.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060*b*, and WDs 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g.

refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD

1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
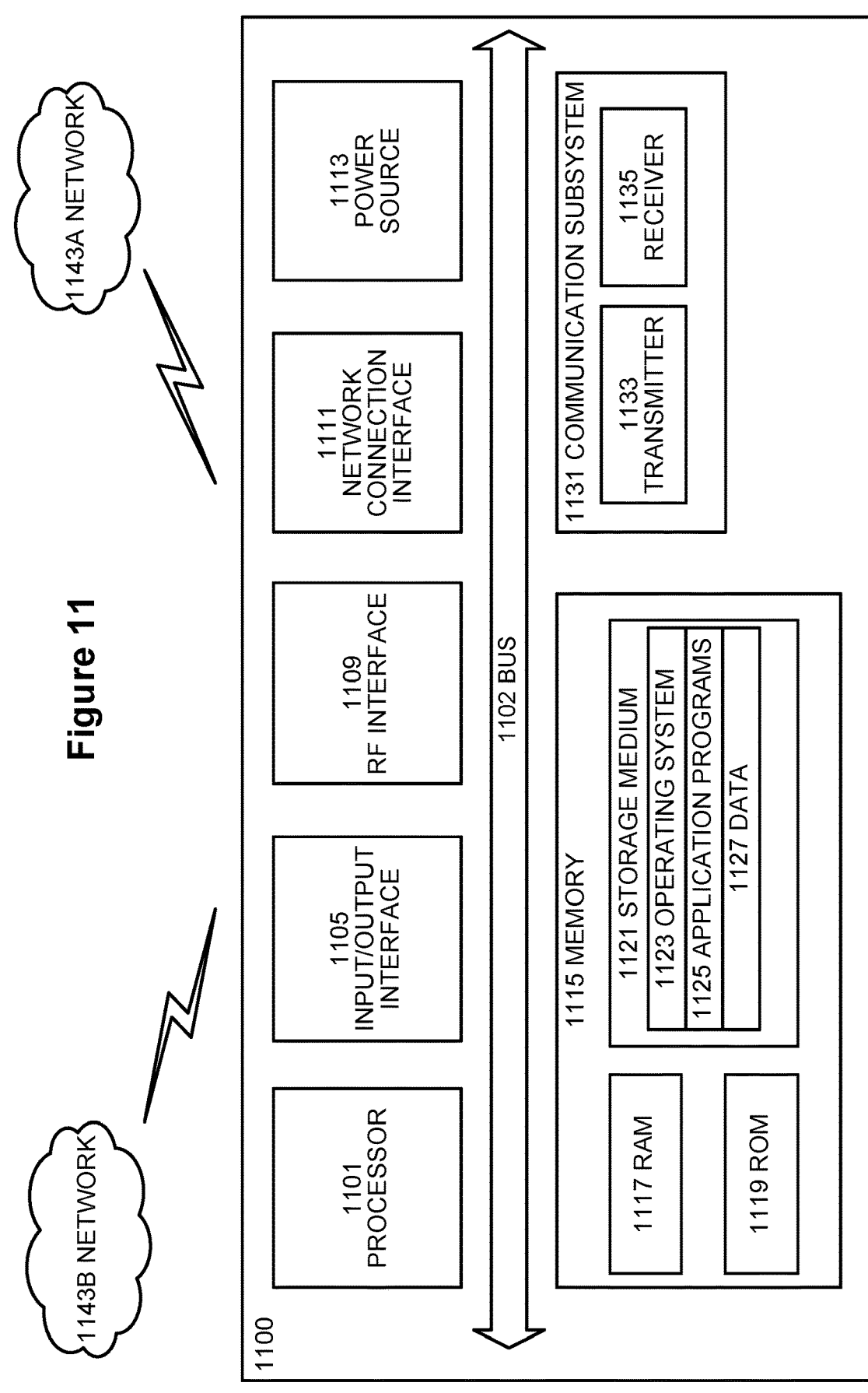
FIG. 11 is a block diagram of a wireless device in accordance with some embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 11200 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143*b* may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
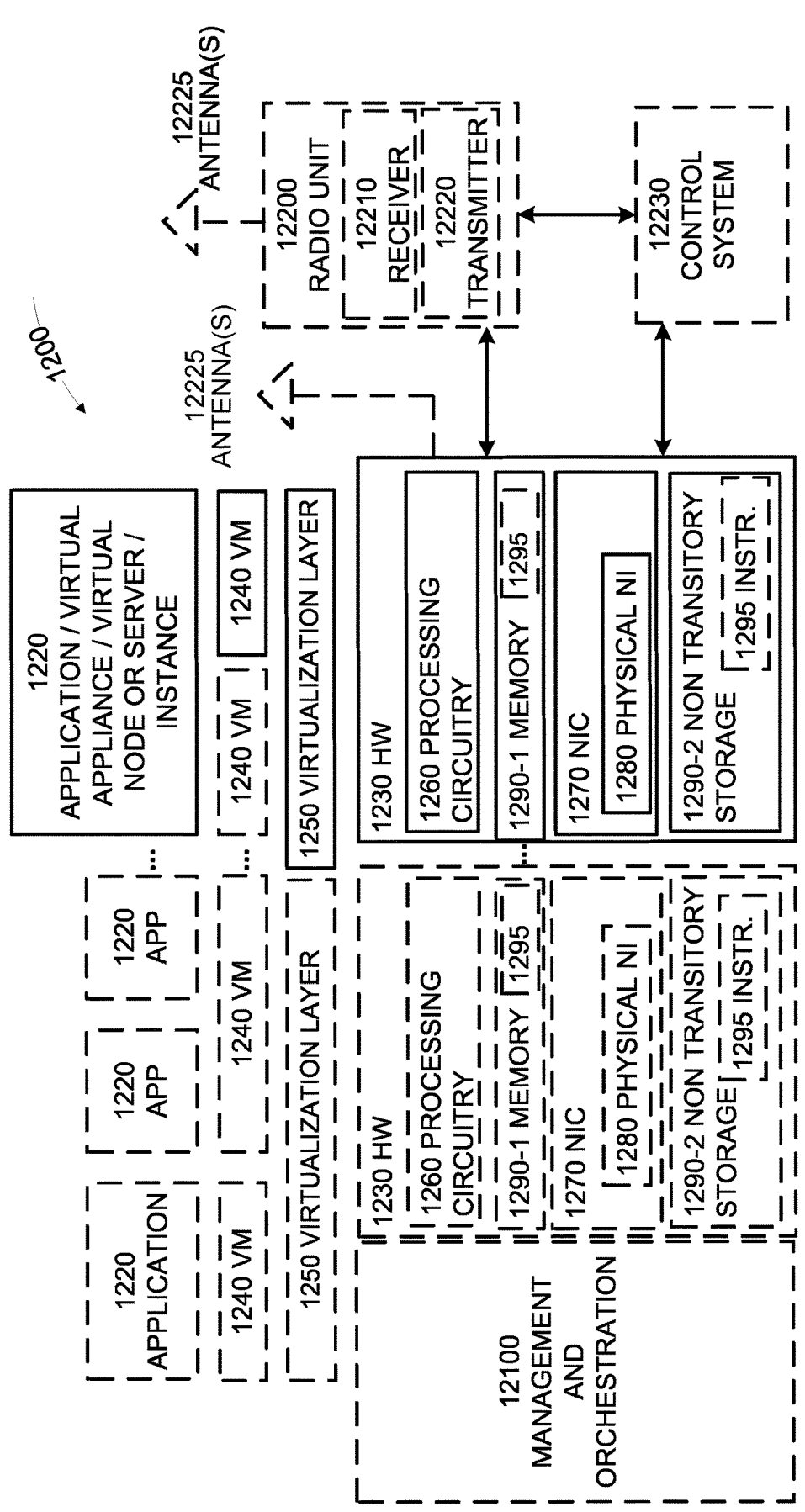
FIG. 12 is a block diagram of a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be affected with the use of control system 12230 which may alternatively be used for communication between the hardware nodes 1230 and radio units 12200.

Figure 13:
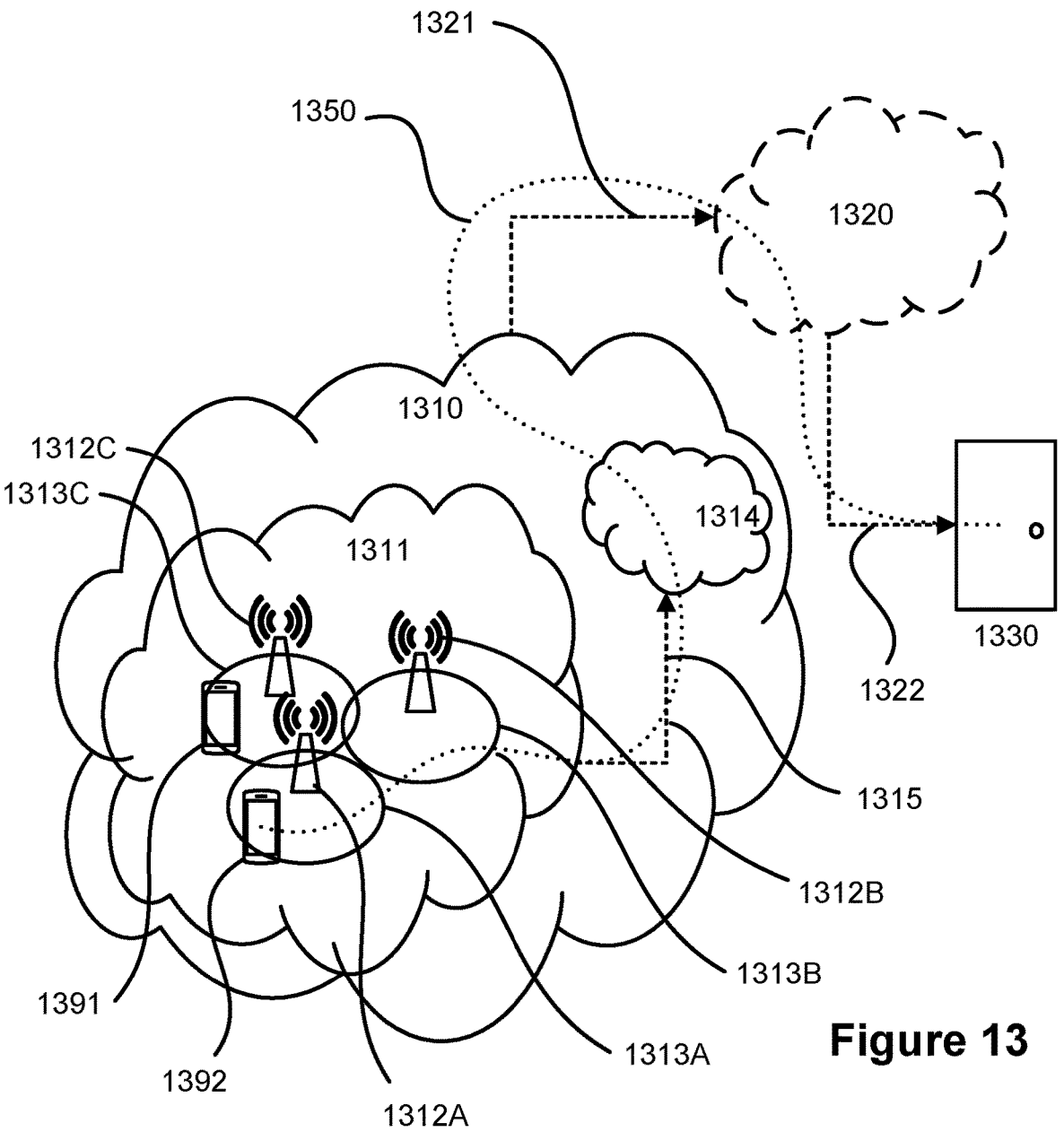
FIG. 13 is a block diagram of a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391,

1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
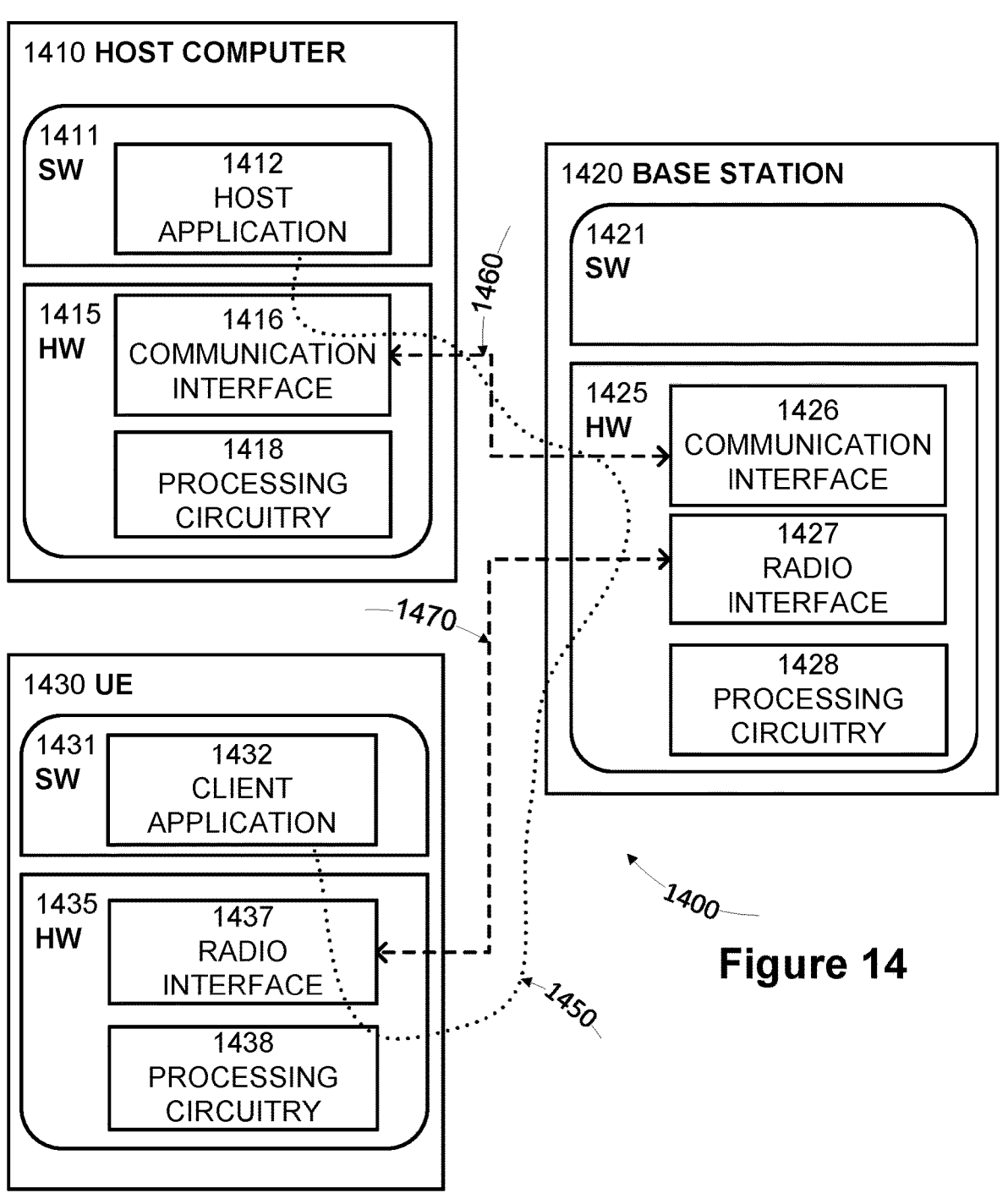
FIG. 14 is a block diagram of a host computer communicating via a base station with a wireless device over a partially wireless connection in accordance with some embodiments.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the UE ability to perform measurement evaluation, which can in turn help the UE to make more correct operational decisions such as RLF declaration, beam failure detection, cell change decisions etc. This can improve the UE performance as well as overall network performance thereby improving the ability for the UE to receive data and information from various service providers.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figures 15, 16:
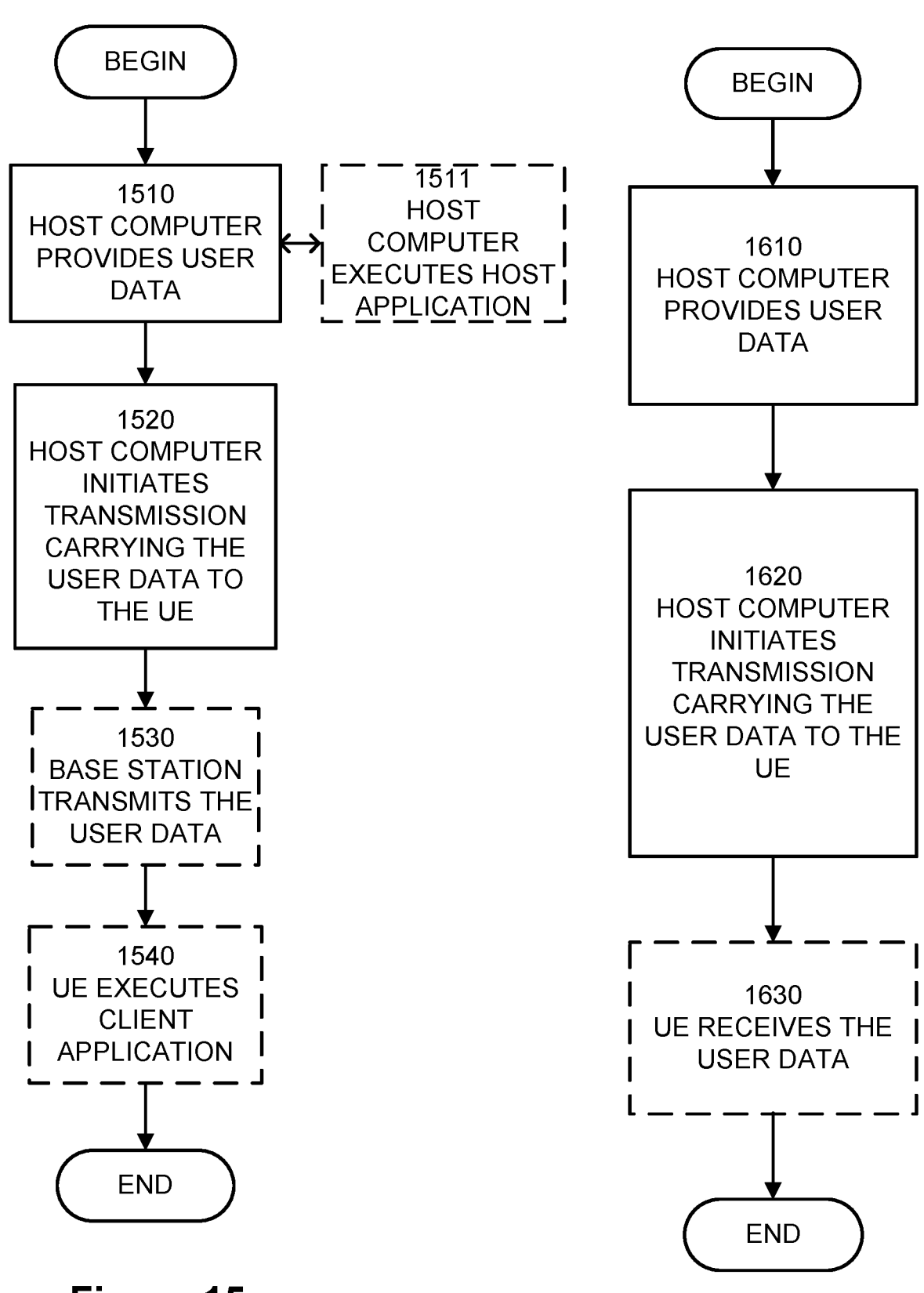
FIG. 15 is a block diagram of methods implemented in a communication system including a host computer, a base station and a wireless device in accordance with some embodiments.
FIG. 16 is a block diagram of methods implemented in a communication system including a host computer, a base station and a wireless device in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figures 17, 18:
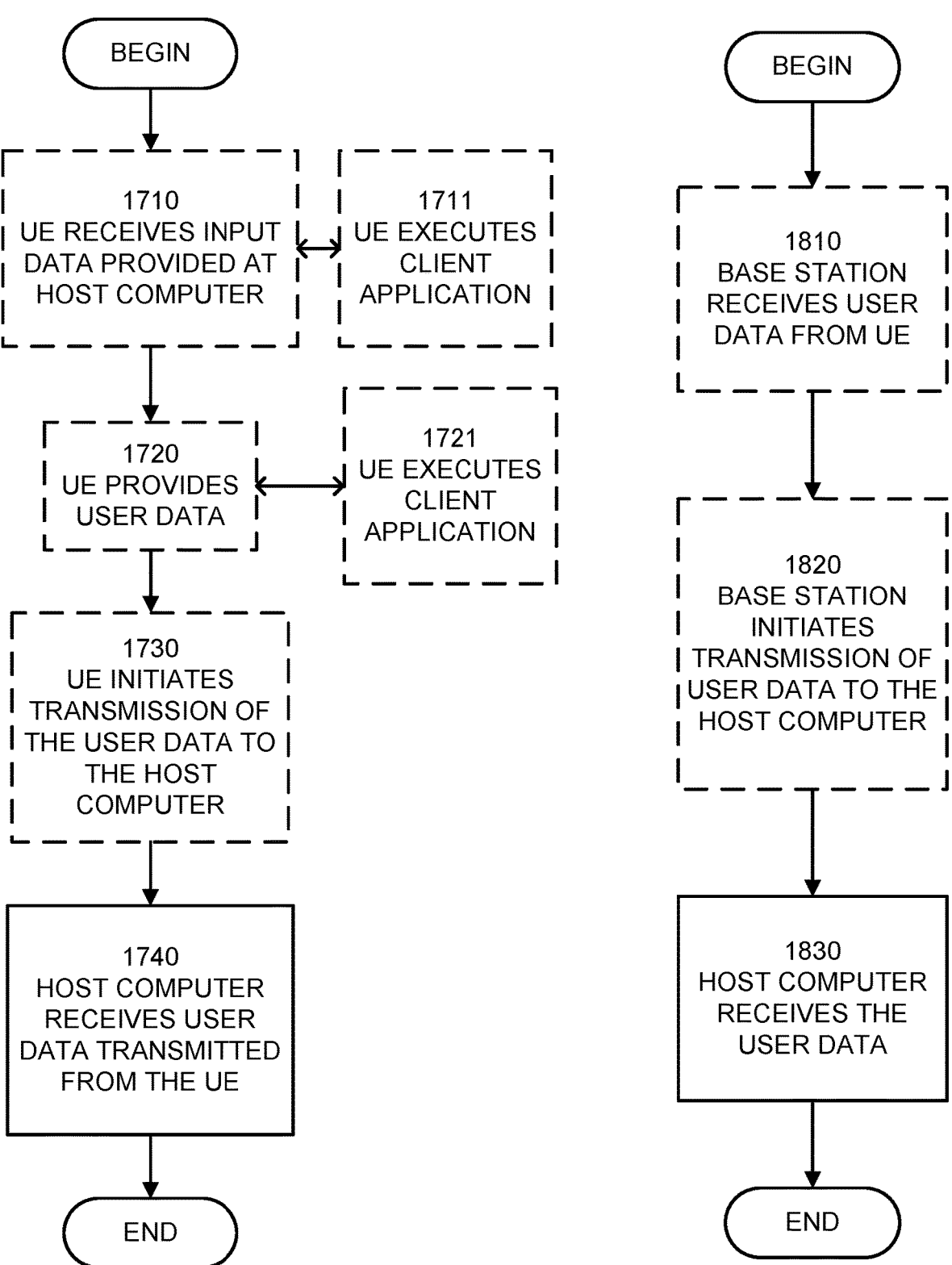
FIG. 17 is a block diagram of methods implemented in a communication system including a host computer, a base station and a wireless device in accordance with some embodiments.
FIG. 18 is a block diagram of methods implemented in a communication system including a host computer, a base station and a wireless device in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally, or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Embodiments

Embodiment 1. A method by a network node in a wireless communication network, comprising:

buffering (702) first data for downlink transmission to a first wireless device;

preemptively transmitting (704) the first data on a channel that is subject to clear channel assessment, CCA, procedures, wherein the first data is transmitted in a reference downlink resource, RDR, domain in the channel in which second data for a second wireless device was previously scheduled for transmission by the network node, wherein the RDR domain is part of a RDR set that excludes a time period in which the network node is precluded from transmitting downlink data on the channel; and transmitting (706) a preemption indicator, PI, to the second wireless device, the preemption indicator identifying the RDR domain.

Embodiment 2. The method of embodiment 1, wherein the preemption indicator comprises a bitmap that indicates that transmission of the second data to the second wireless device in the RDR domain was preempted.

Embodiment 3. The method of embodiment 1 or 2, wherein the RDR domain falls within a channel occupancy time, COT, of a fixed frame period, FFP, used by the network node to access the channel.

Embodiment 4. The method of embodiment 3, wherein the RDR set excludes an IDLE period within the FFP following the COT.

Embodiment 5. The method of any previous embodiment, wherein the RDR set excludes a period reserved for uplink communications on the channel.

Embodiment 6. The method of any previous embodiment, wherein the RDR set excludes a period defined for performing a listen before talk, LBT, procedure by the network node prior to transmitting downlink data.

Embodiment 7. The method of embodiment 6, wherein the period defined for performing LBT falls within a maximum channel occupancy time, MCOT, of a fixed frame period, FFP, used by the network node to access the channel.

Embodiment 8. The method of any previous embodiment, wherein the PI is transmitted on the channel.

Embodiment 9. The method of any previous embodiment, further comprising:

transmitting (802) a resource assignment to the second wireless device identifying downlink resources on the channel in which the second data will be transmitted.

Embodiment 10. The method of embodiment 9, wherein the resource assignment is transmitted to the second wireless device in a same reference data resource as the PI is transmitted.

Embodiment 11. The method of embodiment 9, wherein the resource assignment is transmitted to the second wireless device in a different reference data resource from the reference data resource on which the PI is transmitted.

Embodiment 12. The method of embodiment 9, wherein the resource assignment is transmitted to the second wireless device before the PI is transmitted.

Embodiment 13. The method of any previous embodiment, wherein the RDR set begins at the start of a fixed frame period, FFP.

Embodiment 14. The method of any previous embodiment, wherein the RDR set ends at an end of a fixed frame period, FFP.

Embodiment 15. The method of any previous embodiment, wherein the RDR set ends at an end of a maximum channel occupancy time, MCOT, of a fixed frame period, FFP.

Embodiment 16. The method of embodiment 15, wherein an IDLE period follows the MCOT in the FFP, where in the IDLE period has a duration equal to a larger of 100 microseconds and 5% of the duration of the FFP or a larger of 100 microseconds and 5% of the duration of the MCOT.

Embodiment 17. The method of any previous embodiment, wherein the RDR set is configured using a configuration table having a plurality of rows that correspond to respective RDR domains in the RDR set.

Embodiment 18. The method of embodiment 17, further comprising provisioning the wireless device with a plurality of configuration tables corresponding to respective fixed frame period lengths.

Embodiment 19. The method of any previous embodiment, wherein the RDR set spans across a fixed frame period boundary.

Embodiment 20. The method of embodiment 19, wherein the RDR set spans across an IDLE period between an end of a maximum channel occupancy time, MCOT and a fixed frame period boundary while excluding the IDLE period.

Embodiment 21. The method of any previous embodiment, wherein the RDR set excludes a listen before talk, LBT, period in the MCOT.

Embodiment 22. The method of any previous embodiment, wherein the RDR set excludes a time period reserved for uplink transmission on the channel.

Embodiment 23. The method of any previous embodiment, further comprising:

transmitting the second data to the second wireless device in a same or different channel occupancy time, COT as the PI is transmitted.

Embodiment 24. The method of embodiment 23, further comprising:

transmitting a downlink control information, DCI, to the second wireless device, wherein the DCI schedules resources for transmission of the second data.

Embodiment 25. The method of any previous embodiment, wherein the channel comprises a first multiple input multiple output, MIMO, layer of a plurality of MIMO layers between the network node and the first wireless device.

Embodiment 26. The method of embodiment 25, wherein transmission of the second data is not preempted on a second MIMO layer of the plurality of MIMO layers.

Embodiment 27. The method of embodiment 25, wherein transmission of the second data is preempted on all of the plurality of MIMO layers.

Embodiment 28. The method of any previous embodiment, wherein the PI is transmitted at the beginning of a channel occupancy time, COT, of a fixed frame period, FFP, used by the network node to access the channel.

Embodiment 29. The method of any of embodiments 1 to 27, wherein the PI is transmitted at the end of a channel occupancy time, COT, of a fixed frame period, FFP, used by the network node to access the channel.

Embodiment 30. The method of any of embodiments 1 to 27, wherein the PI is transmitted in a same channel occupancy time, COT, as the RDR domain is located.

Embodiment 31. The method of any of embodiments 1 to 27, wherein the PI is transmitted in a different channel occupancy time, COT, as the RDR domain is located.

Embodiment 32. The method of any previous embodiment, wherein the PI is transmitted in a second channel that is different from the channel.

Embodiment 33. The method of embodiment 32, wherein the second channel comprises a licensed channel.

Embodiment 34. A radio access network, RAN, node (1060) comprising:

processing circuitry (1070); and memory (1080) coupled with the processing circuitry, wherein the memory includes instructions that when executed by the processing circuitry causes the RAN node to perform operations comprising:

buffering (702) first data for downlink transmission to a first wireless device;

preemptively transmitting (704) the first data on a channel that is subject to clear channel assessment, CCA, procedures, wherein the first data is transmitted in a reference downlink resource, RDR, domain in the channel in which second data for a second wireless device was previously scheduled for transmission by the network node, wherein the RDR domain is part of a RDR set that excludes a time period in which the network node is precluded from transmitting downlink data on the channel; and transmitting (706) a preemption indicator, PI, to the second wireless device, the preemption indicator identifying the RDR domain.

Embodiment 35. The RAN node of embodiment 34, wherein the memory includes instructions that when executed by the processing circuitry causes the RAN node to perform operations according to any of embodiments 2 to 33.

Embodiment 36. A radio access network, RAN, node (1060) adapted to perform operations comprising:

buffering (702) first data for downlink transmission to a first wireless device;

preemptively transmitting (704) the first data on a channel that is subject to clear channel assessment, CCA, procedures, wherein the first data is transmitted in a reference downlink resource, RDR, domain in the channel in which second data for a second wireless device was previously scheduled for transmission by the network node, wherein the RDR domain is part of a RDR set that excludes a time period in which the network node is precluded from transmitting downlink data on the channel; and transmitting (706) a preemption indicator, PI, to the second wireless device, the preemption indicator identifying the RDR domain.

Embodiment 37. The RAN node of embodiment 36, wherein the RAN node is adapted to perform operations according to any of embodiments 2 to 33.

Embodiment 38. A method by a wireless device in a wireless communication network, comprising:

receiving (902), from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel;

receiving (904) a preemption indicator, PI, indicating that the first wireless signal was transmitted in the RDR domain preemptively of the second wireless signal; and discarding (906) the first wireless signal in response to the PI.

Embodiment 39. The method of embodiment 38, wherein the preemption indicator comprises a bitmap that indicates that transmission of the second wireless signal to the wireless device in the RDR domain was preempted.

Embodiment 40. The method of embodiment 38 or 39, wherein the RDR domain falls within a channel occupancy time, COT, of a fixed frame period, FFP, used by the network node to access the channel.

Embodiment 41. The method of embodiment 40, wherein the RDR set excludes an IDLE period within the FFP following the COT.

Embodiment 42. The method of any of embodiments 38 to 41, wherein the RDR set excludes a period reserved for uplink communications on the channel.

Embodiment 43. The method of any of embodiments 38 to 42, wherein the RDR set excludes a period defined for performing a listen before talk, LBT, procedure by the network node prior to transmitting downlink data.

Embodiment 44. The method of embodiment 43, wherein the period defined for performing LBT falls within a maximum channel occupancy time, MCOT, of a fixed frame period, FFP, used by the network node to access the channel.

Embodiment 45. The method of any of embodiments 38 to 44, wherein the PI is transmitted on the channel.

Embodiment 46. The method of any of embodiments 38 to 45, further comprising:

receiving a resource assignment identifying downlink resources on the channel in which the second wireless signal will be transmitted.

Embodiment 47. The method of embodiment 46, wherein the resource assignment is received in a same reference data resource as the PI is received.

Embodiment 48. The method of embodiment 46, wherein the resource assignment is received in a different reference data resource from the reference data resource on which the PI is received.

Embodiment 49. The method of embodiment 46, wherein the resource assignment is received before the PI is received.

Embodiment 50. The method of any of embodiments 38 to 49, wherein the RDR set begins at the start of a fixed frame period, FFP.

Embodiment 51. The method of any of embodiments 38 to 50, wherein the RDR set ends at an end of a fixed frame period, FFP.

Embodiment 52. The method of any of embodiments 38 to 51, wherein the RDR set ends at an end of a maximum channel occupancy time, MCOT, of a fixed frame period, FFP.

Embodiment 53. The method of embodiment 52, wherein an IDLE period follows the MCOT in the FFP, where in the IDLE period has a duration equal to a larger of 100 microseconds and 5% of the duration of the FFP or a larger of 100 microseconds and 5% of the duration of the MCOT.

Embodiment 54. The method of any of embodiments 38 to 53, wherein the RDR set is configured using a configuration table having a plurality of rows that correspond to respective RDR domains in the RDR set.

Embodiment 55. The method of embodiment 54, further comprising receiving a message provisioning the wireless device with a plurality of configuration tables corresponding to respective fixed frame period lengths.

Embodiment 56. The method of any of embodiments 38 to 55, wherein the RDR set spans across a fixed frame period boundary.

Embodiment 57. The method of embodiment 56, wherein the RDR set spans across an IDLE period between an end of a maximum channel occupancy time, MCOT and a fixed frame period boundary while excluding the IDLE period.

Embodiment 58. The method of any of embodiments 38 to 57, wherein the RDR set excludes a listen before talk, LBT, period in the MCOT.

Embodiment 59. The method of any of embodiments 38 to 58, wherein the RDR set excludes a time period reserved for uplink transmission on the channel.

Embodiment 60. The method of any of embodiments 38 to 59, further comprising:

receiving the second wireless signal in a same or different channel occupancy time, COT as the PI is received.

Embodiment 61. The method of embodiment 60, further comprising:

transmitting a downlink control information, DCI, to the wireless device scheduling resources for transmission of the second wireless signal.

Embodiment 62. The method of any of embodiments 38 to 61, wherein the channel comprises a first multiple input multiple output, MIMO, layer of a plurality of MIMO layers between the network node and the wireless device.

Embodiment 63. The method of embodiment 62, wherein transmission of the second wireless signal is not preempted on a second MIMO layer of the plurality of MIMO layers.

Embodiment 64. The method of embodiment 62, wherein transmission of the second wireless signal is preempted on all of the plurality of MIMO layers.

Embodiment 65. The method of any of embodiments 38 to 64, wherein the PI is received at the beginning of a channel occupancy time, COT, of a fixed frame period, FFP, used by the network node to access the channel.

Embodiment 66. The method of any of embodiments 38 to 64, wherein the PI is received at the end of a channel occupancy time, COT, of a fixed frame period, FFP, used by the network node to access the channel.

Embodiment 67. The method of any of embodiments 38 to 64, wherein the PI is received in a same channel occupancy time, COT, as the RDR domain is located.

Embodiment 68. The method of any of embodiments 38 to 64, wherein the PI is received in a different channel occupancy time, COT, as the RDR domain is located.

Embodiment 69. The method of any of embodiments 38 to 68, wherein the PI is received in a second channel that is different from the first channel.

Embodiment 70. The method of embodiment 69, wherein the second channel comprises a licensed channel.

Embodiment 71. A wireless device (1010), comprising:

processing circuitry (1020); and memory (1030) coupled with the processing circuitry, wherein the memory includes instructions that when executed by the processing circuitry causes the wireless device to perform operations comprising:

receiving (902), from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel;

receiving (904) a preemption indicator, PI, indicating that the first wireless signal was transmitted in the RDR domain preemptively of the second wireless signal; and discarding (906) the first wireless signal in response to the PI.

Embodiment 72. The wireless device of embodiment 71, wherein the memory includes instructions that when executed by the processing circuitry causes the wireless device to perform operations according to any of embodiments 39 to 70.

Embodiment 73. A wireless device (1010) adapted to perform operations comprising:

receiving (902), from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel;

receiving (904) a preemption indicator, PI, indicating that the first wireless signal was transmitted in the RDR domain preemptively of the second wireless signal; and discarding (906) the first wireless signal in response to the PI.

Embodiment 74. The wireless device of embodiment 73, wherein the wireless device is adapted to perform operations according to any of embodiments 39 to 70.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ACK Acknowledgment
AP Access Point
ARQ Automatic Repeat Request
ASN.1 Abstract Syntax Notation One
AWGN Additive White Gaussian Noise
BCCH Broadcast Control Channel
BCH Broadcast Channel
BLER Block Error Rate
BWP Bandwidth Part
CA Carrier Aggregation
CAPC Channel Access Priority Class
CB Code Block
CBG Code Block Group
CCA Clear Channel Assessment
CC Carrier Component
CCCH SDU Common Control Channel SDU
CDMA Code Division Multiple Access
CGI Cell Global Identifier
CIR Channel Impulse Response
COT Channel Occupancy Time
CP Cyclic Prefix
CPICH Common Pilot Channel
Ec/No Received energy per chip divided by the power density in the band
CQI Channel Quality information
C-RNTI Cell RNTI
CSI Channel State Information CRS Cell Specific Reference Signals
CSI-RS Channel State Information-Reference Signal
CSMA Carrier Sense Multiple Access
CWS Contention Window Size
DAS Distributed Antenna System
DCCH Dedicated Control Channel
DCI Downlink Control Information
DL Downlink
DM Demodulation
DMRS Demodulation Reference Signal
DMTC DRS Measurement Time Configuration
DRS Discovery Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
ED Energy Detection
EDGE Enhanced Data rates for GSM Evolution
eLAA Enhanced License Assisted Access
EN-DC E-UTRAN New Radio Dual Connectivity
eNB E-UTRAN NodeB
eMBB enhanced Mobile Broadband
ePDCCH enhanced Physical Downlink Control Channel
E-SMLC evolved Serving Mobile Location Center
E-UTRA Evolved UTRA
E-UTRAN Evolved UTRAN
ETSI European Telecommunications Standards Institute
FBE Frame Based Equipment
FDD Frequency Division Duplex
feLAA Further Enhanced License Assisted Access
FFP Fixed Frame Period
FFS For Further Study
GC-PDCCH Group Common PDCCH
GERAN GSM EDGE Radio Access Network
gNB Base station in NR
GNSS Global Navigation Satellite System
GPRS General Packet Radio Service
GSM Global System for Mobile communication
HARQ Hybrid Automatic Repeat Request
HO Handover
HSPA High Speed Packet Access
HRPD High Rate Packet Data
IS In Sync
LAA License Assisted Access
LBE Load Based Equipment
LBT Listen-Before-Talk
LOS Line of Sight
LPP LTE Positioning Protocol
LTE Long-Term Evolution
MAC Medium Access Control
MAC CE MAC Control Element
MBMS Multimedia Broadcast Multicast Services
MBSFN Multimedia Broadcast multicast service Single Frequency Network
MBSFN ABS MBSFN Almost Blank Subframe
MCOT Maximum Channel Occupancy Time
MDT Minimization of Drive Tests
MHz Megahertz
MIB Master Information Block
MME Mobility Management Entity
ms millisecond
μs microsecond
MSC Mobile Switching Center
NGC Next Generation Core network NPDCCH Narrowband Physical Downlink Control Channel NR New Radio NR-U NR Unlicensed (NR operation in unlicensed spectrum)

OCNG OFDMA Channel Noise Generator

OFDM Orthogonal Frequency Division Multiplexing

OFDMA Orthogonal Frequency Division Multiple Access

OOS Out of Sync

OSS Operations Support System

OTDOA Observed Time Difference of Arrival

O&M Operation and Maintenance

PCell Primary Cell

PBCH Physical Broadcast Channel

P-CCPCH Primary Common Control Physical Channel

PCell Primary Cell

PCFICH Physical Control Format Indicator Channel

PDCCH Physical Downlink Control Channel

PDCP Packet Data Convergence Protocol

PDP Profile Delay Profile

PDSCH Physical Downlink Shared Channel

PDU Protocol Data Unit

PSCell Primary Secondary Cell

PGW Packet Gateway

PHICH Physical Hybrid-ARQ Indicator Channel

PI Preemption Indicator

PLMN Public Land Mobile Network

PMI Precoder Matrix Indicator

PRACH Physical Random Access Channel

PRS Positioning Reference Signal

PSS Primary Synchronization Signal

PUCCH Physical Uplink Control Channel

PUSCH Physical Uplink Shared Channel

RACH Random Access Channel

QAM Quadrature Amplitude Modulation

QCI QoS Class Indicator

QoS Quality of Service

RAN Radio Access Network

RAT Radio Access Technology

RDR Reference Downlink Resource

RLC Radio Link Control

RLF Radio Link Failure

RLM Radio Link Management or Monitoring

RNC Radio Network Controller

RNTI Radio Network Temporary Identifier

RRC Radio Resource Control

RRM Radio Resource Management

RS Reference Signal

RSCP Received Signal Code Power

RSRP Reference Symbol Received Power/Reference Signal Received Power

RSRQ Reference Signal Received Quality/Reference Symbol Received Quality

RSSI Received Signal Strength Indicator

RSTD Reference Signal Time Difference

SCH Synchronization Channel

SCS Subcarrier Spacing

SCell Secondary Cell

UCI Uplink Control Information

UE User equipment

UL Uplink

URLLC Ultra-reliable and low latency communication

WCDMA Wideband Code Division Multiple Access

SDAP Service Data Adaptation Protocol

SDU Service Data Unit

SFN System Frame Number

SGW Serving Gateway

SI System Information

SIB System Information Block

SINR Signal to Interference and Noise Ratio

SMTC SS/PBCH Block Measurement Time Configuration

SNR Signal to Noise Ratio

SON Self Optimized Network

SS Synchronization Signal

SSB Synchronization Signal Block

SSS Secondary Synchronization Signal

TDD Time Division Duplex

TDOA Time Difference of Arrival

TOA Time of Arrival

TS Technical Specification

TSS Tertiary Synchronization Signal

TTI Transmission Time Interval

UE User Equipment

UL Uplink

UMTS Universal Mobile Telecommunication System

USIM Universal Subscriber Identity Module

UTDOA Uplink Time Difference of Arrival

UTRA Universal Terrestrial Radio Access

UTRAN Universal Terrestrial Radio Access Network

WCDMA Wide CDMA

WLAN Wide Local Area Network

The invention claimed is:

1. A method by a network node in a wireless communication network, comprising:

buffering first data for downlink transmission to a first wireless device;

preemptively transmitting the first data on a channel that is subject to clear channel assessment, CCA, procedures, wherein the first data is transmitted in a reference downlink resource, RDR, domain in the channel in which second data for a second wireless device was previously scheduled for transmission by the network node, wherein the RDR domain is part of a RDR set that excludes a time period in which the network node is precluded from transmitting downlink data on the channel; and transmitting a preemption indicator, PI, to the second wireless device, the preemption indicator identifying the RDR domain;

wherein the RDR domain falls within a channel occupancy time, COT, of a fixed frame period, FFP, used by the network node to access the channel.

2. The method of claim 1, wherein the preemption indicator comprises a bitmap that indicates that transmission of the second data to the second wireless device in the RDR domain was preempted.

3. The method of claim 1, wherein the RDR set excludes an IDLE period within the FFP following the COT.

4. The method of claim 3, wherein the RDR set comprises a set of continuously numbered RDR parts within the RDR domain, wherein the RDR parts are outside the IDLE period.

5. The method of claim 1, wherein the RDR set excludes a period reserved for uplink communications on the channel.

6. The method of claim 1, wherein the RDR set excludes a period defined for performing a listen before talk, LBT, procedure by the network node prior to transmitting downlink data.

7. The method of claim 6, wherein the period defined for performing LBT falls within a maximum channel occupancy time, MCOT, of a fixed frame period, FFP, used by the network node to access the channel.

8. The method of claim 1, further comprising:

transmitting a resource assignment to the second wireless device identifying downlink resources on the channel in which the second data will be transmitted.

9. The method of claim 8, wherein the resource assignment is transmitted to the second wireless device in a same reference data resource as the PI is transmitted; or the resource assignment is transmitted to the second wireless device in a different reference data resource from the reference data resource on which the PI is transmitted; or the resource assignment is transmitted to the second wireless device before the PI is transmitted.

10. The method of claim 1, wherein the RDR set begins at the start of a fixed frame period, FFP; and/or the RDR set ends at an end of a fixed frame period, FFP; and/or the RDR set ends at an end of a maximum channel occupancy time, MCOT, of a fixed frame period, FFP.

11. The method of claim 1, wherein an IDLE period follows a maximum channel occupancy time, MCOT, in the FFP, wherein the IDLE period has a duration equal to a larger of 100 microseconds and 5% of the duration of the FFP or a larger of 100 microseconds and 5% of the duration of the MCOT.

12. The method of claim 1, wherein the RDR set is configured using a configuration table having a plurality of rows that correspond to respective RDR domains in the RDR set.

13. The method of claim 12, further comprising provisioning the wireless device with a plurality of configuration tables corresponding to respective fixed frame period lengths.

14. The method of claim 1, wherein the RDR set spans across a fixed frame period boundary.

15. The method of claim 14, wherein the RDR set spans across an IDLE period between an end of a maximum channel occupancy time, MCOT and a fixed frame period boundary while excluding the IDLE period.

16. The method of claim 1, wherein the RDR set excludes a listen before talk, LBT, period in a maximum channel occupancy time, MCOT.

17. The method of claim 1, further comprising:

transmitting the second data to the second wireless device in a same or different channel occupancy time, COT as the PI is transmitted.

18. The method of claim 17, further comprising:

transmitting a downlink control information, DCI, to the second wireless device, wherein the DCI schedules resources for transmission of the second data.

19. The method of claim 1, wherein the channel comprises a first multiple input multiple output, MIMO, layer of a plurality of MIMO layers between the network node and the first wireless device.

20. The method of claim 19, wherein transmission of the second data is not preempted on a second MIMO layer of the plurality of MIMO layers, or transmission of the second data is preempted on all of the plurality of MIMO layers.

21. The method of claim 1, wherein the PI is transmitted at the beginning of a channel occupancy time, COT, of a fixed frame period, FFP, used by the network node to access the channel;

the PI is transmitted at the end of a channel occupancy time, COT, of a fixed frame period, FFP, used by the network node to access the channel;

the PI is transmitted in a same channel occupancy time, COT, as the RDR domain is located; or the PI is transmitted in a different channel occupancy time, COT, as the RDR domain is located.

22. The method of claim 1, wherein the PI is transmitted in a second channel that is different from the channel.

23. The method of claim 22, wherein the second channel comprises a licensed channel.

24. A radio access network, RAN, node comprising:

processing circuitry; and memory coupled with the processing circuitry, wherein the memory includes instructions that when executed by the processing circuitry causes the RAN node to perform operations comprising:

buffering first data for downlink transmission to a first wireless device;

pre-emptively transmitting the first data on a channel that is subject to clear channel assessment, CCA, procedures, wherein the first data is transmitted in a reference downlink resource, RDR, domain in the channel in which second data for a second wireless device was previously scheduled for transmission by the network node, wherein the RDR domain is part of a RDR set that excludes a time period in which the network node is precluded from transmitting downlink data on the channel; and transmitting a preemption indicator, PI, to the second wireless device, the preemption indicator identifying the RDR domain;

wherein the RDR domain falls within a channel occupancy time, COT, of a fixed frame period, FFP, used by the network node to access the channel.

25. The RAN node of claim 24, wherein the memory includes instructions that when executed by the processing circuitry causes the RAN node to perform operations according to claim 2.

26. A method by a wireless device in a wireless communication network, comprising:

receiving, from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel;

receiving a preemption indicator, PI, indicating that the first wireless signal was transmitted in the RDR domain preemptively of the second wireless signal, wherein the RDR domain falls within a channel occupancy time, COT, of a fixed frame period, FFP, used by the network node to access the channel; and discarding the first wireless signal in response to the PI.

27. A wireless device, comprising:

processing circuitry; and memory coupled with the processing circuitry, wherein the memory includes instructions that when executed by the processing circuitry causes the wireless device to perform operations comprising:

receiving, from a network node, a first wireless signal on a channel that is subject to clear channel assessment, CCA, procedures, wherein the first wireless signal is transmitted by the network node in a reference downlink resource, RDR, domain in the channel in which a second wireless signal was previously scheduled for transmission by the network node to the wireless device, wherein the RDR domain is part of a RDR set that excludes a time period in which the network node is precluded from transmitting downlink data on the channel;

receiving a preemption indicator, PI, indicating that the first wireless signal was transmitted in the RDR domain preemptively of the second wireless signal, wherein the RDR domain falls within a channel occupancy time, COT, of a fixed frame period, FFP, used by the network node to access the channel; and discarding the first wireless signal in response to the PI.

* * * * *